US009129158B1

(12) United States Patent  (10) Patent No.: US 9,129,158 B1
Medasani et al.  (45) Date of Patent: Sep. 8, 2015

(54) METHOD AND SYSTEM FOR EMBEDDING VISUAL INTELLIGENCE

(75) Inventors: Swarup Medasani, Thousand Oaks, CA (US); Suhas E. Chelian, Encino, CA (US); Shinko Y. Cheng, Campbell, CA (US); Rashmi N. Sundareswara, Los Angeles, CA (US); Howard Neely, III, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 695 days.

(21) Appl. No.: 13/412,527

(22) Filed: Mar. 5, 2012

(51) Int. Cl.
*G06K 9/62* (2006.01)
*G06K 9/00* (2006.01)
*G06T 7/20* (2006.01)

(52) U.S. Cl.
CPC ........ *G06K 9/00718* (2013.01); *G06K 9/00335* (2013.01); *G06K 9/6219* (2013.01); *G06K 9/6263* (2013.01); *G06T 7/2046* (2013.01); *G06T 2207/10016* (2013.01)

(58) Field of Classification Search
None
See application file for complete search history.

(56) References Cited

U.S. PATENT DOCUMENTS

| 2010/0157049 | A1* | 6/2010 | Dvir et al. | 348/143 |
| 2011/0064268 | A1* | 3/2011 | Cobb et al. | 382/103 |
| 2013/0114902 | A1* | 5/2013 | Sukthankar et al. | 382/190 |

OTHER PUBLICATIONS

Ballan, Lamberto, et al. "Event detection and recognition for semantic annotation of video." Multimedia Tools and Applications 51.1 (2011): 279-302.*
Zhu, Guangyu, et al. "Detecting video events based on action recognition in complex scenes using spatio-temporal descriptor." Proceedings of the 17th ACM international conference on Multimedia. ACM, 2009.*
Snoek, Cees, Kvd Sande, O. D. Rooij, Bouke Huurnink, J. Uijlings, M. Liempt, M. Bugalhoy et al. "The MediaMill TRECVID 2009 semantic video search engine." In TRECVID workshop. 2009.*
Sridhar, Muralikrishna, Anthony G. Cohn, and David C. Hogg. "Unsupervised Learning of Event Classes from Video." AAAI. May 2010.*
Sridhar, Muralikrishna, Anthony G. Cohn, and David C. Hogg. "Relational Graph Mining for Learning Events from Video." Proceedings of the 2010 conference on STAIRS 2010: Proceedings of the Fifth Starting AI Researchers' Symposium. IOS Press, 2010.*
D'Odorico, Tommaso, and Brandon Bennett. "Detecting events in video data using a formal ontology of motion verbs." Spatial Cognition VIII. Springer Berlin Heidelberg, Aug. 2012. 338-357.*

(Continued)

*Primary Examiner* — Kim Vu
*Assistant Examiner* — Nathan Bloom
(74) *Attorney, Agent, or Firm* — Tope-McKay & Associates

(57) ABSTRACT

Described is a method and system for embedding unsupervised learning into three critical processing stages of the spatio-temporal visual stream. The system first receives input video comprising input video pixels representing at least one action and at least one object having a location. Microactions are generated from the input image using a set of motion sensitive filters. A relationship between the input video pixels and the microactions is then learned, and a set of spatio-temporal concepts is learned from the microactions. The system then learns to acquire new knowledge from the spatio-temporal concepts using mental imagery processes. Finally, a visual output is presented to a user based on the learned set of spatio-temporal concepts and the new knowledge to aid the user in visually comprehending the at least one action in the input video.

22 Claims, 9 Drawing Sheets

(56) References Cited

OTHER PUBLICATIONS

Ballan, Lamberto, Marco Bertini, Alberto Del Bimbo, and Giuseppe Serra. "Video event classification using string kernels." Multimedia Tools and Applications 48, No. 1 (May 2010): 69-87.*

Weiming Hu; Nianhua Xie; Li Li; Xianglin Zeng; Maybank, S., "A Survey on Visual Content-Based Video Indexing and Retrieval," Systems, Man, and Cybernetics, Part C: Applications and Reviews, IEEE Transactions on, vol. 41, No. 6, pp. 797,819, Nov. 2011.*

O'Hara, S.; Yui Man Lui; Draper, B.A, "Unsupervised learning of human expressions, gestures, and actions," Automatic Face & Gesture Recognition and Workshops (FG 2011), 2011 IEEE International Conference on, vol., No., pp. 1,8, Mar. 21-25, 2011.*

Qiong Hu; Lei Qin; Qingming Huang; Shuoiang Jiang; Qi Tian, "Action Recognition Using Spatial-Temporal Context," Pattern Recognition (ICPR), 2010 20th International Conference on, vol., No., pp. 1521, 1524, Aug. 23-26, 2010.*

Anderson, J R, Bothell, D, Byrne, M D, Douglass, S, Lebiere, C, Qin, Y. 2004. An integrated theory of the mind, Psychological Review 111, (4). 1036-1060.

Azuma, R., Hoff, B., Nealy, H., Sarfaty, R. A Motion-Stabilized Outdoor Augmented Reality System. Proceedings of IEEE VR '99 (Houston, TX, Mar. 13-17, 1999), 252-259.

Azuma, R., Neely, H., Hoff, B., Sarfaty, R., Direct Visualization of Spatial Information in Outdoor Scenes, Proceedings of GOMAC 2000.

Barkowsky, T. 2007. Modeling mental spatial knowledge processing: An AI perspective: In: F. Mast and L. Jaenke (Eds.), Spatial processing in navigation, imagery, and perception. Berlin: Springer.

Belkin M. Niyogi P. 2003, Laplacian Eigenmaps for Dimensionality Reduction and Data Representation. Neural Computation, 15(6):1373-1396, Jun. 2003.

Bobick AF, Davis JW. 2001. The recognition of human movement using temporal templates. IEEE Trans. on Pattern Analysis and Machine Intelligence 23(3):257-267, Mar. 2001.

Cheng SY., Trivedi MM, 2006, Turn-Intent Analysis Using Body Pose for Intelligent Driver Assitance, IEEE Pervasive Computing, 5(4):28-37, Oct. 2006.

Cheng SY, Trivedi MM, 2007, Articulated Human Body Pose Inference from Voxel Data Using a Kinematically Constrained Gaussian Mixture Model, In CVPR EHuM2: 2nd Workshop on Evaluation of Articulated Human Motion and Pose Estimation, 2007.

Chikkerur S, Serre T, Poggio T, A 2009. Bayasian inference theory of attention: neuroscience and algorithms, CBCL-280 MIT-CSAIL-TR-2009-047.

Curtis, J, Matthews, G, Baxter, D. 2005. On the Effective Use of Cyc in a Question Answering System. In: Papers from the IJCAI Workshop on Knowledge and Reasoning for Answering Questions, Edinburgh, Scotland.

Dalal N, Triggs B, Schmid, C. 2006. Human Detection Using Oriented Histograms of Flow and Appearance, Proceedings of the European Conference for Computer Vision, 2006.

Derbinsky N, Laird JE. 2008. Efficiently Implementing Episodic Memory Case-Based Reasoning Research and Development, 403-417.

Dollar P, Rabaud V, Cottrell G, Belongie S, 2005, Behavior Recognition via Sparse Spatio-Temporal Features. In Proc. of IEEE Int'l Conf. on Computer Vision and Pattern Recognition, Jun. 2005, San Diego.

Duchenne O, Laptev I, Sivic J, Bach F, Ponce J, 2009. Automatic Annotation of Human Actions in Video. In Proc. of IEEE Int'l Conference on Computer Vision, 2009.

François, AR, Nevatia, R, Hobbs, JR, Bolles, RC, 2005, VERL.: An Ontology Framework for Representing and Annotating Video Events. IEEE Multimedia 12(4): 76-86.

Glasgow, J., Papadias, D. 1992. Computational Imagery. Cognitive Science, 16, 355-394.

Gupta A, Srinivasan P, Shi J and Larry S. Davis Understanding Videos, Constructing Plots—Learning a Visually Grounded Storyline Model from Annotated Videos, Computer Vision and Pattern Recognition 2009.

Gupta A, Kembhavi A and Larry S. Davis, Observing Human-Object Interactions: Using Spatial and Functional Compatibility for Recognition. IEEE Transactions on Pattern Analysis and Machine Intelligence (Special Issue on Probabilistic Graphical Models), Oct. 2009, 1775-1789.

Harabagiu, SM, Miller, GA, Moldovan, DI, 1999, WordNet2—A Morphologically and Semantically Enhanced Resource In Proc. of the ACL SIGLEX Workshop: Standardizing Lexical Resources, pp. 1-8.

Hinton GE, Salakhutdinov RR. 2006. Reducing the dimensionality of data with neural networks. Science, 313:504-507.

Hinton GE, Salakhutdinov RR. 2006. Reducing the dimensionality for deep belief nets. Neural Computation 18: 1527-1554.

Hoiem D, Efros AA, Hebert M. 2008 Putting Objects in Perspective. International Journal of Computer Vision. 2008.

Itti L, Koch C. 2001. Computational Modeling of Visual Attention. Nature Reviews Neuroscience 2(3):194-203.

Jøsang, A., 2008, "Conditional Reasoning with Subjective Logic," Journal of Multiple-Valued Logic and Soft Computing, 15(1), pp. 5-38.

Jhuang H., T, Serre, L. Wolf and T. Poggio, A Biologically Inspired System for Action Recognition, In: Proceedings of the Eleventh IEEE International Conference on Computer Vision (ICCV), 2007.

Kemp C, Tenenbaum JB, Griffiths TL, Yamada T, Ueda N. 2006. Learning systems of concepts with an infinite relational model. In AAAI Proceedings of the Twenty-First National Conference on Aritificial Intelligence, 2006.

Kemp C. Tenenbaum JB. 2008. The Discovery of structural form. Proceedings of the National Academy of Sciences. 105(31), 10687-10692.

Kersten, D, Yuille A. 2003. Bayesian models of object perception. Current Opinion in Neurobiology, 13(2), 1-9.

Kieras, DE, Meyer, DE 1997. An Overview of the EPIC Architecture for Cognition and Performance with Application to Human-Computer Interaction, Human-Computer Interaction, 12, 391-483.

Krishnapuram R, Medasani S, Jung S, Choi Y, 2004, FIRST—Content-based image retrieval based on a fuzzy approach, IEEE Transactions on Knowledge and Data Engineering (TKDE), Oct. 2004.

Laird JE. 2001. It Knows What You're Going To Do Adding Anticipation to a Quakebot. Proc. of the 5th International Conference of Autonomous Agents, 2001.

Laird JE. 2009. Millions of Rules, Billions of Decisions. Presented at the 49th Soar Workshop. sitemaker.umich.edu/soar/files/laird2-millions-updated.pdf.

Laptev I, Marszalek M. Schmid C. Rozenfeld B. 2008. Learning Realistic Human Actions from Movies. In Proc. of IEEE Int'l Conf. on Computer Vision and Pattern Recognition, 2008.

Lathrop SC, Laird JE. 2007, Towards Incorporating Visual Imagery into a Cognitive Architecture. Proc. of the 8th International Conference on Cognitive Modeling, 2007.

Lavee G, Rivlin E. Rudzsky M. 2009, Understanding Video Events: A Survey of Methods for Automatic Interpretation of Semantic Occurences in Video, Technion Computer Science Department, Technical Report CIS 2009-06.

Lee MW; Nevatia R. 2009. Human Pose Tracking in Monocular Sequence Using Multilevel Structured Models. IEEE Trans. on Pattern Analysis and Machien Intelligence, 31(1):27-38.

Lin Y, Druzdel M. 1997. Computational Advantages of Relevance Reasoning in Bayesian Belief Networks. Proceedings of the 13th Conference on Uncertainty in Artificial Intelligence.

Lin L. Gong H, Li L, Wang L. 2009 Semantic event representation and recognition using syntactic attribute graph grammar. Physical Review Letters, 2009.

Lu TC, Przytula W. 2006. Focusing Strategies for Multiple fault Diagnosis. Proceedings of the 19th International FLAIRS Conference (FLAIRS 06), pp. 842-847, Melbourne Beach, FL, May 2006.

Mansinghka VK, Kemp C. Tenenbaum JB., and Griffiths TL, 2006, Structured priors for structure learning. Proceedings of the Twenty-Second Conference on Uncertainty in Artifical Intelligence (UAI 2006).

Medasani S, and Krishnapuram R. 2001. Graph Matching by Relaxation of Fuzzy Assignments. IEEE Trans on Fuzzy Systems, 9(1), 173-183, Feb. 2001.

(56) References Cited

OTHER PUBLICATIONS

Medasani S, Krishnapuram R. 2001. Image Categorization for Efficient Retrieval using Robust Mixture Decomposition. Computer Vision and Image Understanding. 83(3):216-235, 2001.

Medasani S, Owechko Y. 2006. Graphical Swarms for Rapid Detection of Object Associations in Visual Imagery. Proc. of IEEE Swarm Intelligence Symposiums, 2006.

Meng H, Pears N. Freeman M, Bailey C. 2008. Motion history Histograms for Human Action Recognition, Embedded Computer Vision, London 2008, ISBN 978-1-84800-303-3.

Moeslund TB, Hilton A, Kruger V. 2006 A survey of advances in vision-based human motion capture and analysis, Computer Vision and Image Understanding, 104:90-126, 2006.

Loopy belief-propagation for approximate inference: An empirical study. K. Murphy, Y, Weiss, and M. I. Jordan. In K. B. Laskey and H. Prade (Eds.), Uncertainty in Artificial Intelligence (UAI), Proceedings of the Fifteenth Conference, San Mateo, CA: Morgan Kaufmann, 1999.

Mutch J, Knoblich U, Poggio T. 2010. CNS: a GPU-based framework for simulating cortically-organized networks. MIT-CSAIL-TR-2010-013 / CBCL-286, Massachusetts Institute of Technology, Cambridge, MA, Feb. 26, 2010.

Niebles, J., Wang, H. Fei-Fei, L.Unsupervised Learning of Human Action Categories Using Spatial-Temporal Words, BMVC 2006.

Nuxoll AM, Laird JE. 2007, Extending Cognitive Architecture with Episodic Memory. Proc. of 21st National Conference on AI.

Ogata T, Tan JK, Shikawa S. 2008. High-Speed Human motion recognition based on motion history Image and an Eigenspace, IEICE Trans. on Information and Systems, 2006.

Rasmussen C. 2000. The infinite Gaussian mixture model. In Advances in Neural Information Processing Systems 12.

Richardson M., Domingos P. 2006. Markov logic networks. Machine Learning, 62:107-136.

Rosch E. 1978. Principles of categorization. Cognition and Categorization, Ed. Rosch E, Lloyd BB (Lawrence Eribaum, New York), pp. 27-48.

Serre T, Wolf L, Bileschi S, Riesenhuber M, Poggio T. 2007. Object Recognition with Cortex-like Mechanisms, IEEE Transactions on Pattern Analysis and Machine Intelligence, 29, 3, 411-426, 2007.

Serre T. Giese M. 2007. Rapid Serial Action Presentation: New paradigm for the study of movement recognition. VSS, May 2007.

Sidner, C., Lee, C 2003. An Architecture for Engagement in Collaborative Conversations between a Robot and Humans. Technical Report TR2003-012, MERL.

St. Amant, R, Morrison, CT, Chang YH, Cohen, PR, and Beal, C. 2006, An image scheme language. Proceedings of the Seventh International Conference on Cognitive Modeling, pp. 292-297.

Sundareswara R. Schrafer P. Bayesian discounting of camera parameter uncertainty for optimal 3D reconstruction from images. Computer Vision and Image Understanding, 115 (2011) 117-126.

Sundareswara R., Schrafer P 2008. Perceptual Multistability predicted by search model for Bayesian Decisions, Journal of Vision, May 2008.

S. Wintermute and J. Laird, An overview of Spatial Processing in Soar/SVS, Technical Report CCA-TR-2009-01, Center for Cognitive Architecture, Univ. of Michigan, Ann Arbor, 2009.

Tabachneck-Schijf, HJ. Leonardo, AM, Simon, HA, 1997. CaMeRa: A computational model of multiple representations. Cognitive Science, 21(3), 305-350.

Takikawa, M, D'Ambrosio B, and Wright E. Real-Time Inference with Large-Scale Temporal Bayes Nets. Proceedings of the 18th UAI Conference, 2002.

Taylor G. Quist M. Furtwangler S. Knudsen K. 2007, Toward a Hybrid Cultural Cognitive Architecture. Proc. of 1st International Workshop on Cognition and Culture at CogSci2007.

Tillman RE, Danks D, Glymour C. 2009, Integrating locally learned causal structures with overlapping variables. Proc. Advances in Neural Information Processing Systems 21 (NIPS 2008).

Tipping ME, 2001. Sparse Kernel Principal Component Analysis, Neural Information Processing Systems, 2001.

Tran S. Davis L. Visual event modeling and recognition using Markov logic networks. European Conference on Computer Vision, 2008.

Vitaladevuni SN, Kellokumpu S, Davis LS. 2008. Action Recognition Using Ballistic Dynamics. In Proc. of the Int'l Conf. on Computer Vision and Pattern Recognition Conference, 2008.

Weinland D, Ronfard R, Boyer E, 2006 Free Viewpoint Action Recognition using Motion History Volumes. Computer Vision and Image Understanding, Oct. 16, 2006.

Wintermute S, Laird JE, 2007, Predicate Projection in a Bimodal Spatial Reasoning System. In Proc. of the 3rd Artificial Intelligence and Interactive Digital Entertainment Conference, 2007.

Yedidia JS, Freeman WT, Weiss, Y, 2003 Understanding Belief Propagation and its Generalizations, Exploring Artificial Intelligence in the New Millennium, ISBN 1558608117, Chap. 8. pp. 239-236, Jan. 2003.

\* cited by examiner

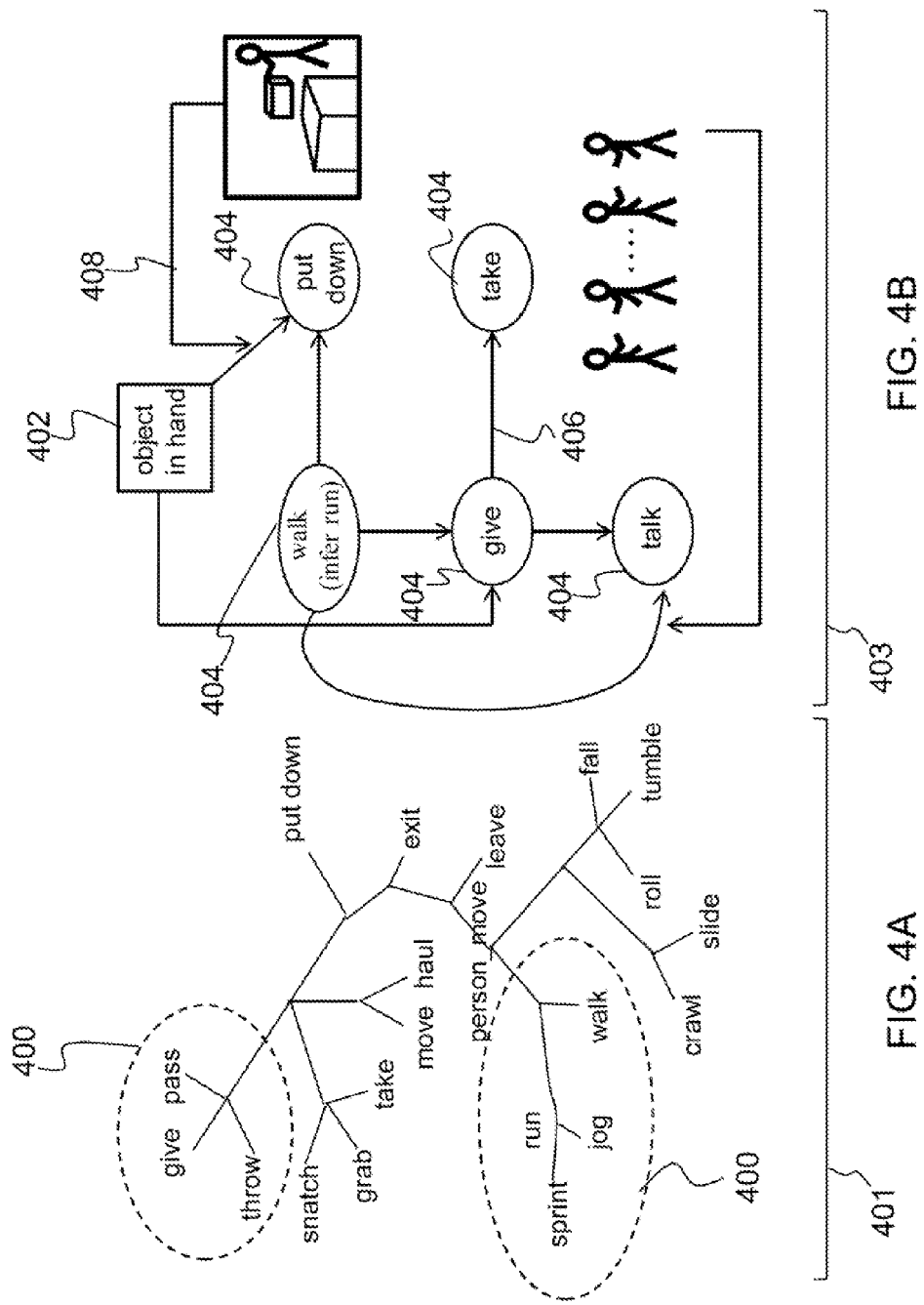

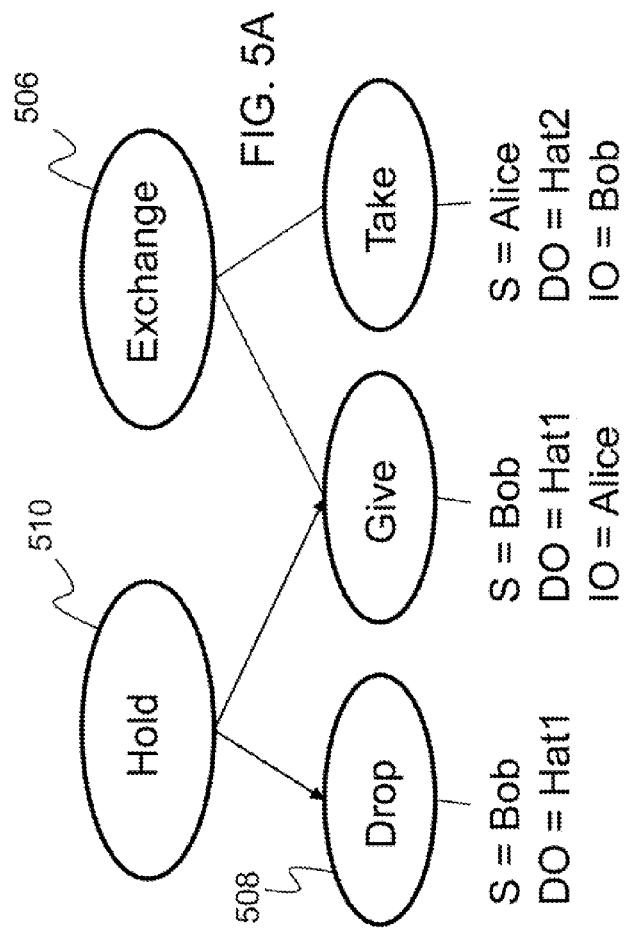
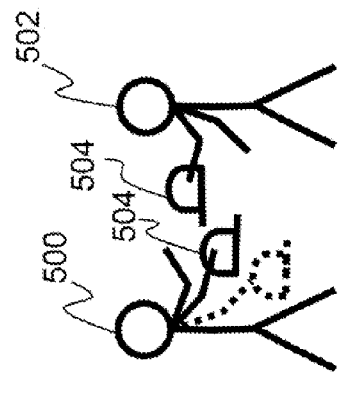
FIG. 5A
FIG. 5B
Alice and Bob exchange hats

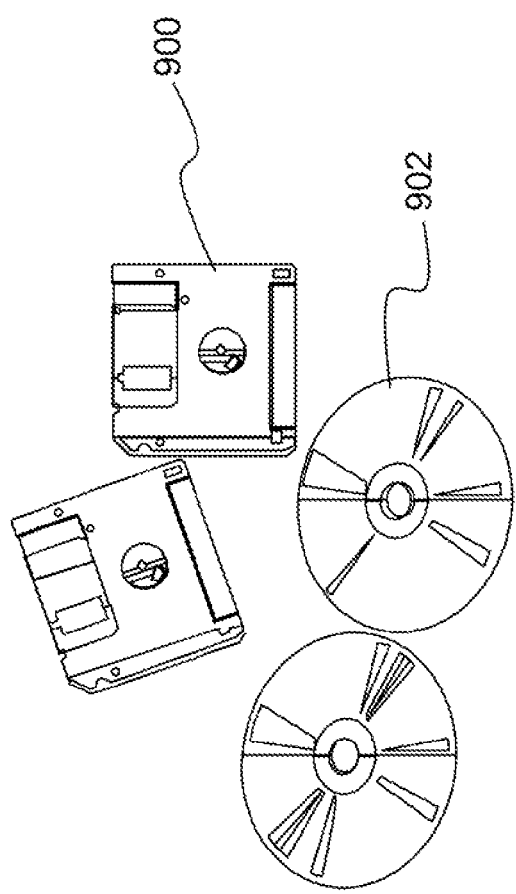

METHOD AND SYSTEM FOR EMBEDDING VISUAL INTELLIGENCE

BACKGROUND OF THE INVENTION (1) Field of Invention

The present invention relates to a system for embedding visual intelligence and, more particularly, to a system for embedding visual intelligence that enables machines to visually perceive and contemplate through visual intelligence modules and system integration.

(2) Description of Related Art

Visual processing is the flow of information from visual sensors to cognitive processing. Typical visual processing methods first decompose scenes into objects, track them, and then attempt to recognize spatio-temporal actions by using sophisticated hand-coded models. Since these models are either built manually or use a fixed structure (i.e., not extensible), they do not account for wide variations in actions, and cannot generalize to newer actions. Traditional symbolic reasoning systems rely heavily on hand-crafted domain specific knowledge, pre-defined symbolic descriptions, and the assumption that perception and reasoning are independent, sequential operations. However, real-world problems require richly intertwined dynamic methods for perception and reasoning in order to envision possible scenarios, acquire new knowledge, and augment cognitive capabilities.

The prior art described below include limitations in generic event representation; building concept hierarchies and graphical models for action understanding; and reasoning, envisionment, and grounding. For instance, regarding limitations of current spatio-temporal patterns, dynamics-based approaches to visual intelligence rely on optical flow patterns to segment and classify actions (see Literature Reference No. 73). These approaches model velocity patterns of humans (e.g., ballistic, spring-mass movements) and report 92% accuracy. However, this value was reported for 2 classes of actions, and the algorithm has not been shown to scale well with more classes and moving clutter. Motion history based approaches are generally computationally inexpensive (see Literature Reference Nos. 49, 50, 55, 74). However, these approaches suffer from needing an image alignment process to make the features position-invariant, thus making the method sensitive to noise in the silhouettes used. Pixel level "bag of words" based approaches also use space-time features from various sized video "cuboids', the collection of which are used to represent the action in video (see Literature Reference Nos. 17, 18, 37). These approaches, however, disregard information on the spatial groupings of sub-blocks.

Regarding limitations of current spatio-temporal concepts, the use of AND/OR graphs (see Literature Reference Nos. 21, 41) for behavior recognition offer an elegant solution to represent structure. However, variation in expression of an action and across classes of action is not handled. Some approaches focus on human pose estimation and dynamics (see Literature Reference Nos. 40, 72). Unfortunately, they lack extensibility in generic action modeling. Use of Latent Semantic Analysis (see Literature Reference No. 53) offers unsupervised learning but lacks spatial and temporal invariance.

Regarding limitations of current reasoning, envisionment, and grounding systems, several cognitive architectures (see Literature Reference Nos. 1, 33) elucidate psychology experiments. However, they do not scale well to large problems and often lack the ability to store perceptual memories, including imagery. Case-based reasoning systems (see Literature Reference Nos. 4, 20, 67) can examine and produce perceptual symbols, but are typically built with little generalization across application domains. Probabilistic logic methods (see Literature Reference Nos. 28, 57) handle uncertainty well but require significant tuning for new domains, and can be computationally cumbersome. Existing symbolic representations of spatio-temporal actions (see Literature Reference Nos. 19, 63) can perform visual inspection, yet lack mental imagery capabilities.

Current approaches cannot accomplish the range of recognition, reasoning, and inference tasks described by the present invention. Thus, a continuing need exists for a system that integrates visual processing and symbolic reasoning to emulate visual intelligence.

SUMMARY OF THE INVENTION

The present invention relates to a system for embedding visual intelligence. The system comprises one or more processors and a memory having instructions such that when the instructions are executed, the one or more processors perform operations of first receiving an input video comprising input video pixels representing at least one action and at least one object having a location. Microactions are generated from the input image using a set of motion sensitive filters. A relationship between the input video pixels and the microactions is learned in an unsupervised manner. A set of spatio-temporal concepts from the microactions is learned in an unsupervised manner. The system then learns, from the microactions, a set of concept hierarchies comprising spatio-temporal action concepts and a set of causal relationships between the spatio-temporal action concepts in an automatic, unsupervised manner using concept learning techniques. Additionally, the system learns to acquire new knowledge from the spatio-temporal action concepts using mental imagery models in an unsupervised manner. Finally, a visual output is presented to a user based on the learned set of spatio-temporal action concepts and the new knowledge to aid the user in visually comprehending the at least one action in the input video.

In another aspect, the visual output is at least one of a video and a textual description.

In another aspect, the system further comprises a spatio-temporal representations module for capturing event-invariant information in the input video using a series of filtering and max operations in repeating layers; an attention model module for generating video masks to focus attention of the spatio-temporal representations module to specific areas of the input video in order to generate the microactions; and a concept learning module for stringing together the microactions to compose full actions and learning of the set of concept hierarchies through structure learning.

In another aspect, the system further comprises a visual object recognition module for determining the location of the at least one object in the input video; and a hypothesis module for generating at least one hypothesis of the at least one action based on known concepts and the at least one object in the input video.

In another aspect, the system further comprises a visual inspection module for comparing the at least one hypothesis with the input video; a validation module for validating the at least one hypothesis using feedback from the visual inspection module; and an envisionment module for generating envisioned imagery of the at least one hypothesis to reason and gain new knowledge.

In another aspect, the system further comprises a knowledgebase module for storing domain knowledge, the hierarchy of action concepts from the concept learning module, and knowledge generated from reasoning on the envisioned imagery; a dialog processing module for parsing at least one input text query; and a symbolic reasoning module for locating answers to the at least one input text query in the knowledge-base module and outputting a textual description.

In another aspect, the set of concept hierarchies comprises a plurality of nodes, where each node represents a cluster of microactions.

The invention further comprises a video processing subsystem for a taskable smart camera system to be utilized with the system above comprising a video processor module, a camera module separate from the video processor module, and a common interface between the video processor module and the camera module.

As can be appreciated by one in the art, the present invention also comprises a method for causing a data processor to perform the acts described herein. The acts can be performed as operations that are performed by the data processor upon execution of code that is stored in a memory.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A illustrates an action-concept hierarchy according to the present invention;

FIG. 4B illustrates a Partially Dynamic Bayesian Network (PDBN) representing static and dynamic nodes according to the present invention;

FIG. 5A illustrates schema binding according to the present invention;

FIG. 5B illustrates envisionment with transcription according to the present invention;

FIG. 9 is an illustration of a computer program product according to the present invention.

DETAILED DESCRIPTION

Figure 1:
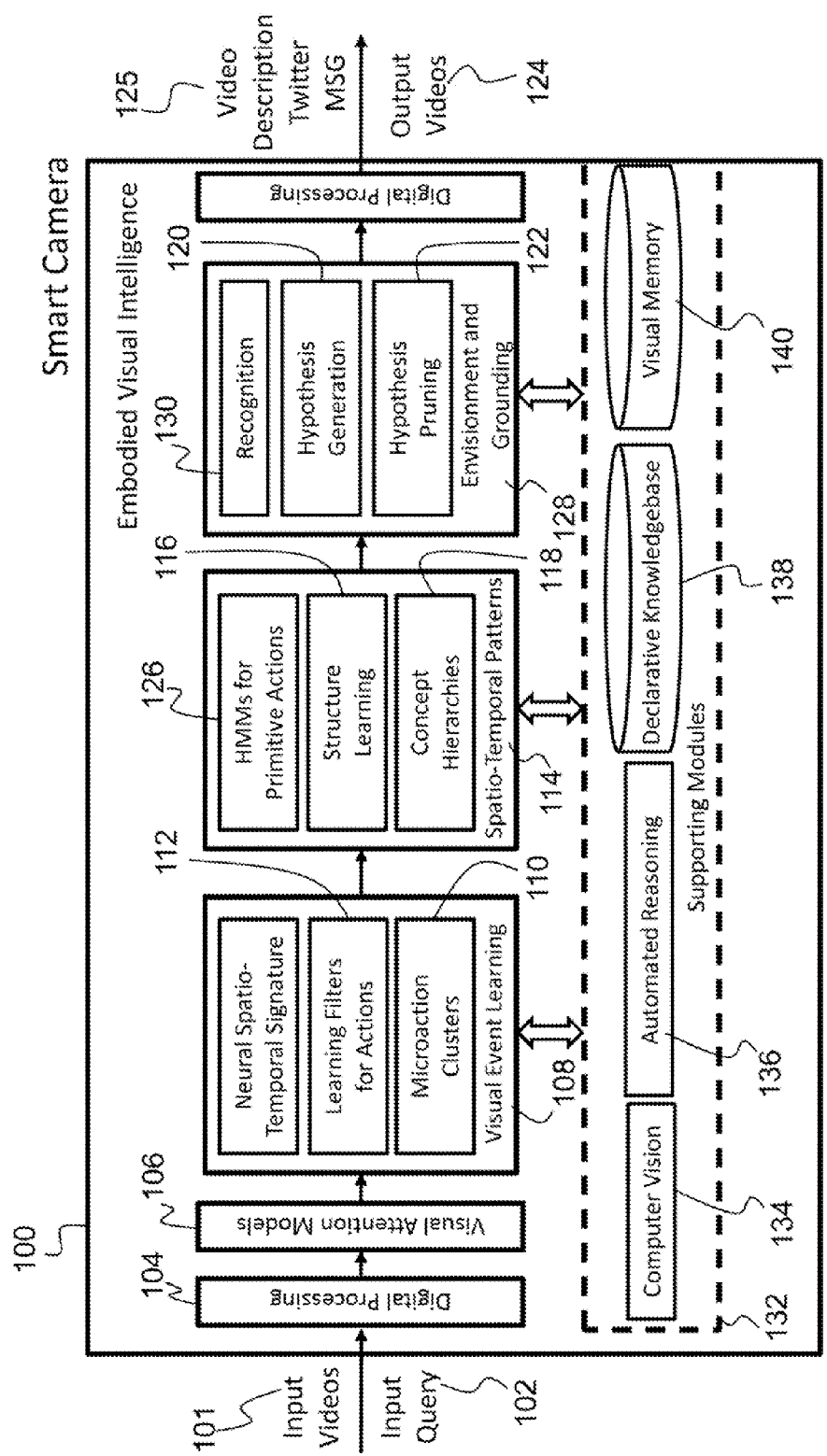
FIG. 1 is a block diagram depicting a system for embedding visual intelligence according to the present invention.

The present invention relates to a method and system that enables machines to visually perceive and contemplate through visual intelligence modules and system integration. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Anderson, J R, Bothell, D, Byrne, M D, Douglass, S, Lebiere, C, Qin, Y. 2004. An integrated theory of the mind. Psychological Review 11 i, (4). 1036-1060.
2. Azuma, R., Hoff, B., Neely, H., Sarfaty, R. A Motion-Stabilized Outdoor Augmented Reality System. *Proceedings of IEEE VR '99* (Houston, Tex., 13-17 Mar. 1999), 252-259.
3. Azuma, R., Neely, H., Hoff, B., Sarfaty, R., Direct Visualization of Spatial Information in Outdoor Scenes, *Proceedings of GOMAC*-2000.
4. Barkowsky, T. 2007. Modeling mental spatial knowledge processing: An AI perspective. In: F. Mast and L. Jaenke (Eds.), Spatial processing in navigation, imagery, and perception. Berlin: Springer.
5. Belkin M, Niyogi P. 2003. Laplacian Eigenmaps for Dimensionality Reduction and Data Representation, Neural Computation, 15(6):1373-1396, 2003 June
6. Bechtel, R. & Koss, F. (2009). TEAL Phase 11 Final Report. Contract Number W56HZV-07-C-0516, TACOM-Warren US Army TARDEC.

7. Blackman S, Popli R. 1999. Design and Analysis of Modern Tracking Systems, Artech House, Norwood Mass., ISBN 1-58053-006-0.
8. Bobick A F, Davis J W. 2001. The recognition of human movement using temporal templates. IEEE Trans. on Pattern Analysis and Machine Intelligence 23(3):257-267, 2001 March
9. Cheng S Y., Trivedi M M. 2006. Turn-Intent Analysis Using Body Pose for Intelligent Driver Assistance, IEEE Pervasive Computing, 5(4):28-37, 2006 October-December
10. Cheng S Y, Trivedi M M. 2007. Articulated Human Body Pose Inference from Voxel Data Using a Kinematically Constrained Gaussian Mixture Model, In CVPR EHuM2: 2nd Workshop on Evaluation of Articulated Human Motion and Pose Estimation, 2007.
11. Cheng S Y, Daily M, Owechko Y, Medasani S, Bonefas Z. 2009. Video-based obstacle detection for coordi-nated machines. IFAC BioRobotics 4, 2009 Sep.
12. Chikkerur S, Serre T, Poggio T, A. 2009. Bayesian inference theory of attention: neuroscience and algorithms," CBCL-280 MIT-CSAIL-TR-2009-047.
13. Curtis, J, Matthews, G, Baxter, D. 2005. On the Effective Use of Cyc in a Question Answering System. In: Papers from the IJCAI Workshop on Knowledge and Reasoning for Answering Questions. Edinburgh, Scotland.
14. Dalal N, Triggs B, Schmid, C. 2006. Human Detection Using Oriented Histograms of Flow and Appearance, Proceedings of the European Conference for Computer Vision, 2006.
15. Derbinsky N, Laird J E. 2008. Efficiently Implementing Episodic Memory Case-Based Reasoning Research and Development, 403-417.
16. Derbinsky N, Laird J E. 2009. Efficiently Implementing Episodic Memory International Conference on Case-Based Reasoning, ICCBR, 2009.
17. Dollar P, Rabaud V, Cottrell G, Belongie S. 2005. Behavior Recognition via Sparse Spatio-Temporal Features. In Proc. of IEEE Int'l Conf. on Computer Vision and Pattern Recognition, 2005 June, San Diego.
18. Duchenne O, Laptev I, Sivic J, Bach F, Ponce J. 2009. Automatic Annotation of Human Actions in Video. In Proc. of IEEE Int'l Conference on Computer Vision, 2009.
19. François, A R, Nevatia, R, Hobbs, J R, Bolles, R C. 2005. VERL: An Ontology Framework for Representing and Annotating Video Events. IEEE MultiMedia 12(4): 76-86.
20. Glasgow, J., Papadias, D. 1992. Computational Imagery. Cognitive Science, 16, 355-394.
21. Gupta A, Srinivasan P, Shi J and Larry S. Davis Understanding Videos, Constructing Plots—Learning a Visually Grounded Storyline Model from Annotated Videos, Computer Vision and Pattern Recognition 2009.
22. Gupta A, Kembhavi A and Larry S. Davis, Observing Human-Object Interactions: Using Spatial and Functional Compatibility for Recognition. IEEE Transactions on Pattern Analysis and Machine Intelligence (Special Issue on Probabilistic Graphical Models), October 2009, 1775-1789.
23. Harabagiu, S M, Miller, G A, Moldovan, D I. 1999. WordNet 2—A Morphologically and Semantically Enhanced Resource. In Proc. of the ACL SIGLEX Workshop: Standardizing Lexical Resources, pp. 1-8.
24. Hinton G E, Salakhutdinov R R. 2006. Reducing the dimensionality of data with neural networks. Science, 313: 504-507.
25. Hinton G E, Osindero S, Teh Y. 2006. A fast learning algorithm for deep belief nets. Neural Computation 18: 1527-1554.
26. Hoiem D, Efros A A, Hebert M. 2008 Putting Objects in Perspective. International Journal of Computer Vision, 2008.
27. Itti L, Koch C. 2001. Computational Modeling of Visual Attention. Nature Reviews Neuroscience 2(3): 194-203.
28. Jøsang, A., 2008, "Conditional Reasoning with Subjective Logic," Journal of Multiple-Valued Logic and Soft Computing, 15(1), pp. 5-38.
29. Jhuang H., T. Serre, L. Wolf and T. Poggio. A Biologically Inspired System for Action Recognition, In: Proceedings of the Eleventh IEEE International Conference on Computer Vision (ICCV), 2007.
30. Kemp C, Tenenbaum J B, Griffiths T L, Yamada T, Ueda N. 2006. Learning systems of concepts with an infinite relational model. In AAAI Proceedings of the Twenty-First National Conference on Artificial Intelligence, 2006.
31. Kemp C. Tenenbaum J B. 2008. The discovery of structural form. Proceedings of the National Academy of Sciences. 105(31), 10687-10692.
32. Kersten, D, Yuille A. 2003. Bayesian models of object perception. Current Opinion in Neurobiology, 13(2), 1-9.
33. Kieras, D E, Meyer, D E 1997. An Overview of the EPIC Architecture for Cognition and Performance with Application to Human-Computer Interaction. Human-Computer Interaction, 12, 391-483.
34. Krishnapuram R, Medasani S: Jung S, Choi Y, Balasubramaniam, R. 2004. Content-based image retrieval based on a fuzzy approach. IEEE Transactions on Knowledge and Data Engineering (TKDE), 2004 October, 1185-1199.
35. Laird J E. 2001. It Knows What You're Going To Do: Adding Anticipation to a Quakebot. Proc. Of the $5^{th}$ International Conference of Autonomous Agents, 2001.
36. Laird J E. 2009. Millions of Rules, Billions of Decisions. Presented at the 49th Soar Workshop. sitemaker.u-mich.edu/soar/files/laird2-millions-updated.pdf
37. Laptev I, Marszalek M, Schmid C, Rozenfeld B. 2008. Learning Realistic Human Actions from Movies. In Proc. of IEEE Int'l Conf. on Computer Vision and Pattern Recognition, 2008.
38. Lathrop S C, Laird J E. 2007. Towards Incorporating Visual Imagery into a Cognitive Architecture. Proc. Of the $8^{th}$ International Conference on Cognitive Modeling, 2007.
39. Lavee G, Rivlin E, Rudzsky M. 2009. Understanding Video Events: A Survey of Methods for Automatic Interpretation of Semantic Occurrences in Video, Technion Computer Science Department, Technical Report CIS 2009-06.
40. Lee M W; Nevatia R. 2009. Human Pose Tracking in Monocular Sequence Using Multilevel Structured Models. IEEE Trans. on Pattern Analysis and Machine Intelligence, 31(1):27-38.
41. Lin Y, Druzdel M. 1997. Computational Advantages of Relevance Reasoning in Bayesian Belief Networks. Proceedings of the 13th Conference on Uncertainty in Artificial Intelligence.
42. Lin L, Gong H, Li L, Wang L. 2009 Semantic event representation and recognition using syntactic attribute graph grammar. Physical Review Letters, 2009.
43. Lu T C, Przytula W. 2006. Focusing Strategies for Multiple fault Diagnosis. Proceedings of the $19^{th}$ International FLAIRS Conference (FLAIRS 06), p.p. 842-847, Melbourne Beach, Fla., May, 2006.
44. Mansinghka V K, Kemp C, Tenenbaum J B., and Griffiths T L. 2006. Structured priors for structure learning. Proceedings of the Twenty-Second Conference on Uncertainty in Artificial Intelligence (UAI 2006).

45. Markman E. 1989 *Naming and Categorization in Children* (MIT Press, Cambridge, Mass.).
46. Medasani S, and Krishnapuram R. 2001. Graph Matching by Relaxation of Fuzzy Assignments. IEEE Trans on Fuzzy Systems, 9(1), 173-183, 2001 February
47. Medasani S, Krishnapuram R. 2001. Image Categorization for Efficient Retrieval using Robust Mixture Decomposition. Computer Vision and Image Understanding. 83(3):216-235, 2001.
48. Medasani S, Owechko Y. 2006. Graphical Swarms for Behavior Recognition. Proc. of IEEE Swarm Intelligence Symposium, 2006.
49. Meng H, Pears N, Freeman M, Bailey C. 2008. Motion history Histograms for Human Action Recognition, Embedded Computer Vision, London 2008, ISBN 978-1-84800-303-3.
50. Moeslund T B, Hilton A, Kruger V. 2006. A survey of advances in vision-based human motion capture and analysis, Computer Vision and Image Understanding, 104:90-126, 2006.
51. Loopy belief-propagation for approximate inference: An empirical study. K. Murphy, Y. Weiss, and M. I. Jordan. In K. B. Laskey and H. Prade (Eds.), *Uncertainly in Artificial Intelligence (UAI), Proceedings of the Fifteenth Conference*, San Mateo, Calif.: Morgan Kaufmann, 1999.
52. Mutch J, Knoblich U, Poggio T. 2010. CNS: a GPU-based framework for simulating cortically-organized networks. MIT-CSAIL-TR-2010-013/CBCL-286, Massachusetts Institute of Technology, Cambridge, Mass., 2010 Feb. 26.
53. Niebles, J., Wang, H. Fei-Fei, L. Unsupervised Learning of Human Action Categories Using Spatial-Temporal Words, BMVC 2006.
54. Nuxoll A M, Laird J E. 2007. Extending Cognitive Architecture with Episodic Memory. Proc. Of $21^{st}$ National Conference on AI.
55. Ogata T, Tan J K, Shikawa S. 2006. High-Speed Human motion recognition based on motion history Image and an Eigenspace, IEICE Trans. On Information and Systems, 2006.
56. Rasmussen C. 2000. The infinite Gaussian mixture model. In *Advances in Neural Information Processing Systems* 12.
57. Richardson M., Domingos P. 2006. Markov logic networks. Machine Learning, 62:107-136.
58. Rosenbloom P S, Laird J E, Newell A. 1993. The Soar Papers: Research on Integrated Intelligence, MIT Press, Cambridge, Mass. 1993.
59. Rosch E. 1978. Principles of categorization. *Cognition and Categorization*, Ed. Rosch E, Lloyd B B (Lawrence Erlbaum, New York), pp 27-48.
60. Serre T, Wolf L, Bileschi S, Riesenhuber M, Poggio T. 2007. Object Recognition with Cortex-like Mechanisms, IEEE Transactions on Pattern Analysis and Machine Intelligence, 29, 3, 411-426, 2007.
61. Serre T, Giese M. 2007. Rapid Serial Action Presentation: New paradigm for the study of movement recognition. VSS, May 2007.
62. Sidner, C., Lee, C. 2003. An Architecture for Engagement in Collaborative Conversations between a Robot and Humans. Technical Report TR2003-012, MERL.
63. St. Amant, R, Morrison, C T, Chang Y H, Cohen, P R, and Beal, C. 2006. An image schema language. Proceedings of the Seventh International Conference on Cognitive Modeling, pp. 292-297.
64. Sundareswara R. Schrater P. Bayesian Averaging of Sampled 3D Reconstructions leads to Better Accuracy. *Computer Vision and Image Understanding*. (under review)
65. Sundareswara R., Schrater P 2008. Perceptual Multistability predicted by search model for Bayesian Decisions, *Journal of Vision*, May 2008.
66. S. Wintermute and J. Laird, An overview of Spatial Processing in Soar/SVS, Technical Report CCA-TR-2009-01, Center for Cognitive Architecture, Univ. Of Michigan, Ann Arbor, 2009.
67. Tabachneck-Schijf, H J, Leonardo, A M, Simon, H A. 1997. CaMeRa: A computational model of multiple representations. Cognitive Science, 21(3), 305-350.
68. Takikawa, M, D'Ambrosio B, and Wright E. Real-Time Inference with Large-Scale Temporal Bayes Nets. *Proceedings of the 18th UAI Conference*, 2002.
69. Taylor G, Quist M, Furtwangler S, Knudsen K. 2007. Toward a Hybrid Cultural Cognitive Architecture. Proc. Of $1^{st}$ International Workshop on Cognition and Culture at CogSci, 2007.
70. Tillman R E, Danks D, Glymour C. 2009. Integrating locally learned causal structures with overlapping variables. Proc. Advances in Neural Information Processing Systems 21 (NIPS 2008).
71. Tipping M E. 2001. Sparse Kernel Principal Component Analysis, Neural Information Processing Systems, 2001.
72. Tran S, Davis L. Visual event modeling and recognition using Markov logic networks. European Conference on Computer Vision, 2008.
73. Vitaladevuni S N, Kellokumpu S, Davis L S. 2008. Action Recognition Using Ballistic Dynamics, In Proc. of the Int'l Conf. on Computer Vision and Pattern Recognition Conference, 2008.
74. Weinland D, Ronfard R, Boyer E. 2006 Free Viewpoint Action Recognition using Motion History Volumes. Computer Vision and Image Understanding, 2006 Oct. 16.
75. Wintermute S, Laird J E. 2007. Predicate Projection in a Bimodal Spatial Reasoning System. In Proc. of the $3^{rd}$ Artificial Intelligence and Interactive Digital Entertainment Conference, 2007.
76. Wray, R., Crossman, J., & Zaientz, J. (in production). Cognitive Fusion Phase II Final Report. Contract Number FA8750-07-C-0160, AFRL Rome Laboratory.
77. Yedidia J S, Freeman W T, Weiss, Y, 2003 Understanding Belief Propagation and Its Generalizations, Exploring Arlifcial Intelligence in the New Millennium, ISBN 1558608117, Chap. 8, pp. 239-236, 2003 January (2) PRINCIPAL ASPECTS The present invention has three "principal" aspects. The first is a system for embedding visual intelligence into processing stages of a spatio-temporal visual stream. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for embedding visual intelligence into processing stages of a spatio-temporal visual stream, typically in the form of software, operated using a data processing system (computer or computer network). The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) SPECIFIC DETAILS (2.1) Introduction

The present invention can learn from visual experience to perceive a variety of useful actions, handle their myriad manifestations and contexts, contemplate and reason with plausible depictions, and augment symbolic knowledge. The system described herein overcomes previous limitations, and enables a versatile and complete solution intrinsically addressing the spatial and temporal complexity problems inherent to visual intelligence, by embedding unsupervised learning into three critical processing stages of the spatio-temporal visual stream. The high-level systems integration concept will allow known and candidate visual intelligence approaches to be integrated with known camera subsystems, while remaining within size, weight, and power constraints appropriate for vehicle applications (e.g., unmanned ground vehicles).

While there exist known methods for pure symbolic reasoning or pure perceptual processing, the present invention handles both ends of the spectra in a more integrated manner. The approach is focused in making machines visually intelligent, allowing them to contemplate and engage in abstract thought. The system gains general intelligence by learning representations in compositional increments and addresses inference and reasoning from low to higher levels of abstraction. This effective modeling of the dynamic interactions and rich intertwines between perceptual and symbolic reasoning modes helps achieve a higher level of cognition. The invention described herein focuses on using mental imagery models to fluidly transfer information across symbolic reasoning and visual reasoning/processing modules, which allows envisioning and reasoning with dynamically changing information.

The present invention embeds learning into three critical processing states of the spatio-temporal visual stream. First, learning of generic representations of microactions from a holistic view of the salient segments in a video, so it can provide a compact representation that facilitates understanding of actions and can be acquired unsupervised. Second, automatic learning of concept hierarchies and causal relations from microactions and their inter-relationships. This innovation uses weakly labeled data and concept learning techniques to automatically learn the hierarchical and causal relationships between actions which, in turn, provides the ability to innately handle the various manifestations of the nuances in the actions. Third, using mental imagery-based processes to model dynamic interactions between visual processing modules and symbolic reasoning modules, so the system can reason through plausible explanations while being grounded in its beliefs and goals. This step uses using mental imagery models to fluidly transfer information from symbolic and visual reasoning modules. Each of these states will be described in further detail below.

Furthermore, the present invention describes a taskable smart camera system that can visually perceive, contemplate, and respond to queries pertaining to observed events using visual intelligence software modules as part of an integrated system. A smart camera is a vision system which is capable of extracting application-specific information from captured images, along with generating event descriptions of making decisions used in an automated system.

FIG. 1 is a block diagram depicting a method and system 100 for embedding visual intelligence. Input to the system described herein consists of input video 101 and input queries 102 (e.g., text-queries). Videos of interest (i.e., input video 101) contain events that can be modeled using actors and other objects that can be described in the form of sentences of the form S-V-(O)-(PP), where S is for subject noun, V is for verb, O is for object noun and PP is for prepositional phrase. Parentheses indicate optional sentence components. Non-limiting examples of "operationally" relevant sentences are "Man entered building," "Woman gave device to man," or "Vehicle stops on road." Input text-queries elicit information from the system regarding the observed videos There are three types of queries in the present invention, and each returns a different type of information. The first type of query is an existence of concepts. A concept consists of the constituent parts of a sentence or the sentence itself. For example, any and all parts to the sentence, "Man entered building" provide an example of a concept. A query of existence may be of the form: "Did you see the "man"? Did you see anyone "enter"? Did you see any "vehicles stop on the road"? Response information is returned from the system in the form of video clips capturing, animations depicting, and text description responses describing the concepts. The second type of query is a text description of concepts (e.g., S-V-(O)-(PP)). The third type of query is a graphical visualization (i.e., animation) of concepts (e.g., S-V-(O)-(PP)). The queries (i.e., input video 101 and input query 102) are digitally processed 104. Digital processing 104 refers to signal conditioning of an input video 101 and/or an input query (i.e., text). Visual attention models 106 are then generated. Visual attention models 106 refer to modules that estimate volumes of video that humans may find interesting using a computation model of the primate visual pathway.

The main theme in the present invention is unsupervised learning of generalized action concepts in compositional increments. Action perception is viewed as a composition of three stages with each stage providing increasing levels of abstraction from the input. The three stages map to critical elements in the visual intelligence block diagram shown in FIG. 1. The first stage, visual event learning 108, contains neural spatio-temporal signatures, microaction clusters 110, and learning filters for actions 112. Neural spatio-temporal signatures consist of the output of several motion sensitive filters. The visual event learning 108 stage focuses on abstracting from video pixels of an input video 101 to an internal representation called microactions (or microaction clusters 110) that serve as a foundation for generic event representation. The microaction clusters 110 are generated using a unique set of motion sensitive filters (learning filters for actions 112) that are position and scale invariant and self-organize to form an alphabet from which the different events can be represented. Learning filters for action 112 refers to the development of position and scale invariance within each filter. Microaction clusters 110 refer to grouping similar filter response vectors.

The second stage of abstraction, spatio-temporal patterns 114, builds on the microaction clusters 110 space and learns concepts through structure learning 116 for the domain of actions. Structure learning 116 refers to a method that automatically discovers generative models for concepts from microaction sequences. The spatio-temporal patterns 114 contain Hidden Markov Models (HMMs) for primitive actions 126, structure learning, 116, and concept hierarchies 118. HMMs for primitive actions 126 consist of graphical models of actions where nodes represent states, and edges represent transitions between states.

Inspired by concept learning in humans, the data-driven structure learning method automatically discovers generative models for concepts, their organization hierarchy (concept hierarchies 118), and causal relationships. Concept hierarchies 118 refer to the output of structure learning 116, which encode relationships between actions, or a set of spatio-temporal action concepts. The third stage of abstraction, which is envisionment and grounding 128, contains recognition 130, hypothesis generation 120, and hypothesis pruning 122. The envisionment and grounding 128 stage uses mental imagery processes to envision and reason through plausible alternatives (i.e., hypothesis generation 120, hypothesis pruning 122) and discover new knowledge. Recognition 130 consists of belief propagation on graphical models from the spatio-temporal patterns 114 stage. Hypothesis generation 120 refers to initiating several paths within the graphical models from the spatio-temporal patterns 114 stage. Hypothesis pruning 122 refers to removing one or more paths within the graphical models from the spatio-temporal patterns 114 stage based on constraints from symbolic reasoning.

Lastly, these modules are supported by computer vision, automated reasoning, declarative knowledgebase, and visual memory supporting modules 132. Computer vision 134 refers to modules whose functions include object recognition, fingerprinting, and tracking. Automated reasoning 136 refers to modules whose functions include symbolic reasoning and natural language processing. Further, declarative knowledgebase 138 refers to a store of domain knowledge, the hierarchy of action concepts from the concept learning module, and knowledge generated from reasoning on the envisioned imagery, which will be described in further detail below. Visual memory 140 refers to a store of previously seen episodes, or avatars and scenes, which can played back or envisioned respectively.

The mental imagery processes are based on functional models that explain visuospatial cognition in humans and allow for effective modeling of the rich interactions between visual and symbolic reasoning. The learned concepts and contemplations are presented to a user as a visual output, which may include a video rendering (output videos 124) and/or a video description 125 (e.g., textual description) to aid the user in visually comprehending actions. Knowledge acquired through visual experience is then grounded with symbolic knowledge to augment and evolve the cognitive capability. Models for spatio-temporal visual attention and intention that focus on segments of interest in the action sequences serve to prime the system. Each of these aspects will be described in further detail below.

Figure 2:
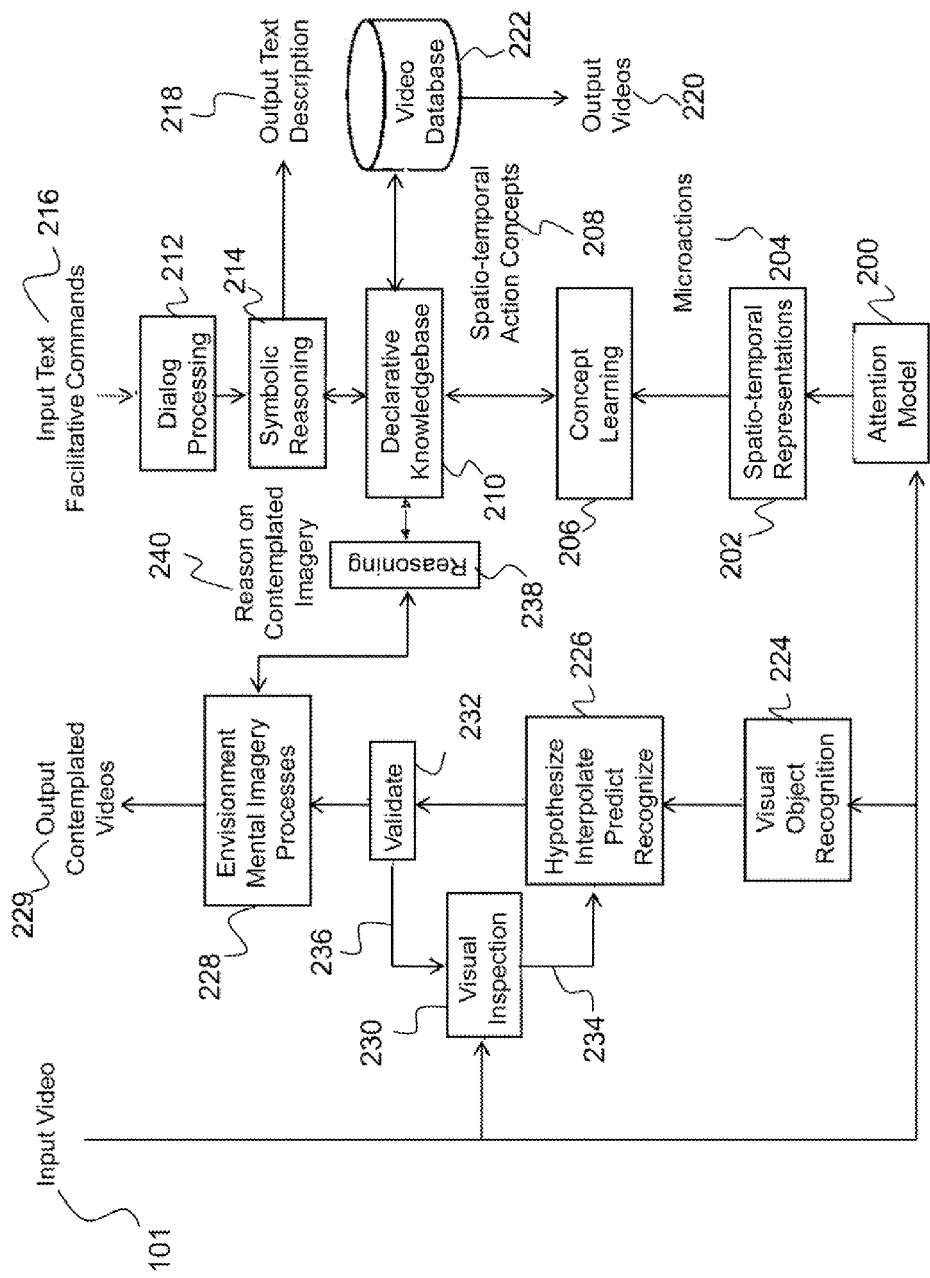
FIG. 2 is a detailed block diagram depicting a system for embedding visual intelligence according to the present invention.

A detailed block diagram of the present invention is shown in FIG. 2. Each image in an input video 101 travels along three parallel paths in the system. The first path is through an attention model module 200 and a spatio-temporal representations module 202. The attention model module 200 generates video masks to focus the attention of the spatio-temporal representations module 202 to certain areas of the input video 101. The spatio-temporal representations module 202 captures event-invariant information in video using a series of filtering and max operations in repeating layers, gradually building up selectivity and invariance to spatial and temporal variations of moving objects in a scene of the input video 101.

The attention model module 200 and spatio-temporal representations module 202 return microaction 204 activation signals that are used by the next module, the concept learning module 206. Microactions 204 are video primitives that comprise components of the sentence. Microactions 204 represent a dictionary of primitive features, and combinations of these microactions 204 strung in parallel and in sequence represent full actions, as will be described in further detail below. The attention model module 200 and the spatio-temporal representation module 202 work hand-in-hand to generate discriminative microactions 204 primitives unpolluted by scene clutter.

The concept learning module 206 is an automated mechanism to compose microactions 204 and learn a hierarchy of action concepts (concept hierarchies 118 in FIG. 1). It uses a structure learning (116 in FIG. 1) mechanism to accomplish the stringing together of microactions 204 to compose actions and to learn a hierarchy of actions or a set of spatio-temporal action concepts 208. The hierarchy from the concept learning module 206 is then used to populate and augment the declarative knowledgebase module 210, which is a long-term store of concepts which are both relevant and frequent. The declarative knowledgebase module 210 stores domain knowledge, action hierarchy from the concept learning module 206, and knowledge generated from reasoning on envisioned imagery.

The dialog processing module 212 and the symbolic reasoning module 214 parse input text facilitative commands 216 presented to the system (e.g. Did a man enter a building? Describe what action occurred, etc.), inform other components to return relevant responses, and return appropriate output textual descriptions 218 and relevant output videos 220 from a video database 222, if any. The symbolic reasoning module 214 uses the declarative knowledgebase 210 to find answers to textual queries 216. The digital processing module (digital processing 104 in FIG. 1) is a textual processing engine that parses input text queries 216.

The second path of the input video 101 is through a series of visual object recognition 224 algorithms generating the locations of objects in imagery. The locations of objects in the individual frames of the input video 101 as well as in a sequence of videos represent the nouns in the concepts. These object locations along with current concepts can be used to hypothesize, interpolate, and predict possible alternatives in a hypothesize module 226. Using the hypothesize module 226, current objects in a scene and known concepts are used to hypothesize possible actions.

The possible contemplations can be validated using the third pathway, the visual inspection pathway, which is part of the envisionment mental imagery processes 228. Envisionment refers to the ability to create renderings of currently seen actions as well as contemplated scenarios. Further, envisionment allows for the system to visualize a contemplated hypothesis so that it can reason on the contemplation and gain more knowledge. The output of this pathway includes contemplated videos 229. The visual inspection module 230 is composed of the interaction between input videos 101 and models of actions from the hypothesize module 226 and the validation module 232. In other words, the input videos 101 are inspected against models of actions. With the validation module 202, contemplated hypotheses are validated using feedback from the visual inspection module 230 and the hypothesize module 226. The first path 234 represents a bottom-up, data-driven process of matching video to models, while the second path 236 represents a top down, model-driven process of verifying models. The output of these modules represents the probabilities to possible actions, or "verbs" of sentences in the reasoning module 238, which reasons on contemplated imagery 240.

In summary, the system of the present invention will take in input videos and optional input text and process the inputs to generate a video rendering and/or textual description/message as a visual output. As a non-limiting example, the system generates a textual message, which could also be accompanied by a rendered video to help explain the situation to the user. The textual message serves as an alert to the user that a certain expression of behavior has occurred in a scene of the input video. Alternatively, if a user is only interested in receiving rendered video as the visual output (as opposed to a textual description), the user sets up the system so that the system will only generate the selected output.

The innovations described below overcome previous limitations, enabling a versatile and complete solution by embedding unsupervised learning at three critical stages in the visual perception pipeline. The innovations can be summarized into the following key points. First, build a position- and time-invariant spatio-temporal representation by extending the neuroscience-inspired CBCL model that allows complex movement concepts to be captured. Second, develop an unsupervised learning method for hierarchical and causal organization of action concepts by finding relevant form and structure using Bayesian inference. Third, construct mental imagery processes to fluidly propagate information between visual and symbolic reasoning modes enabling reasoning through contemplated alternatives to make more insightful conclusions. These innovations flow from several insights in neuro-inspired processes in the brain (see Literature Reference No. 60), Bayesian models that mimic putative reasoning processes for cognition in children (see Literature Reference No. 31), and functional models for visuospatial cognition (see Literature Reference No. 66).

(2.2) A Generic Visual Event Representation: Microaction Primitives

The method used to represent visual events must capture event-relevant information and disregard (i.e., be invariant to) event-irrelevant information in video. The approach utilized in the present invention addresses this problem with a series of filtering and max operations in repeating layers, building up selectivity and invariance to spatial and temporal variations of moving objects in the scene. This approach mimics the current understanding of how visual information is so effectively processed by the mammalian visual cortex. The hierarchical feed-forward architecture has an associated learning process that is unsupervised, and was shown to be an effective visual events representation.

The present invention builds upon a neuroscience-inspired spatio-temporal model (see Literature Reference Nos. 29, 61) that generates position-, scale-, and time-invariant microaction activation patterns with which higher level concepts about the domain of actions can be learned. Using this basic model, recognition accuracy of 92% for 9 classes of events (trained using 16 samples per class) has been reported. Previous studies and psychophysical results strongly suggest the existence of spatio-temporal pattern detectors in the brain that are optimally stimulated by short, but complex, motion segments (see Literature Reference No. 60). Based on this model and recent theoretical results described below, the present invention describes an unsupervised method to learn microaction activation patterns that aims to achieve the same 90% accuracy for many more classes of atomic events.

Figure 3:
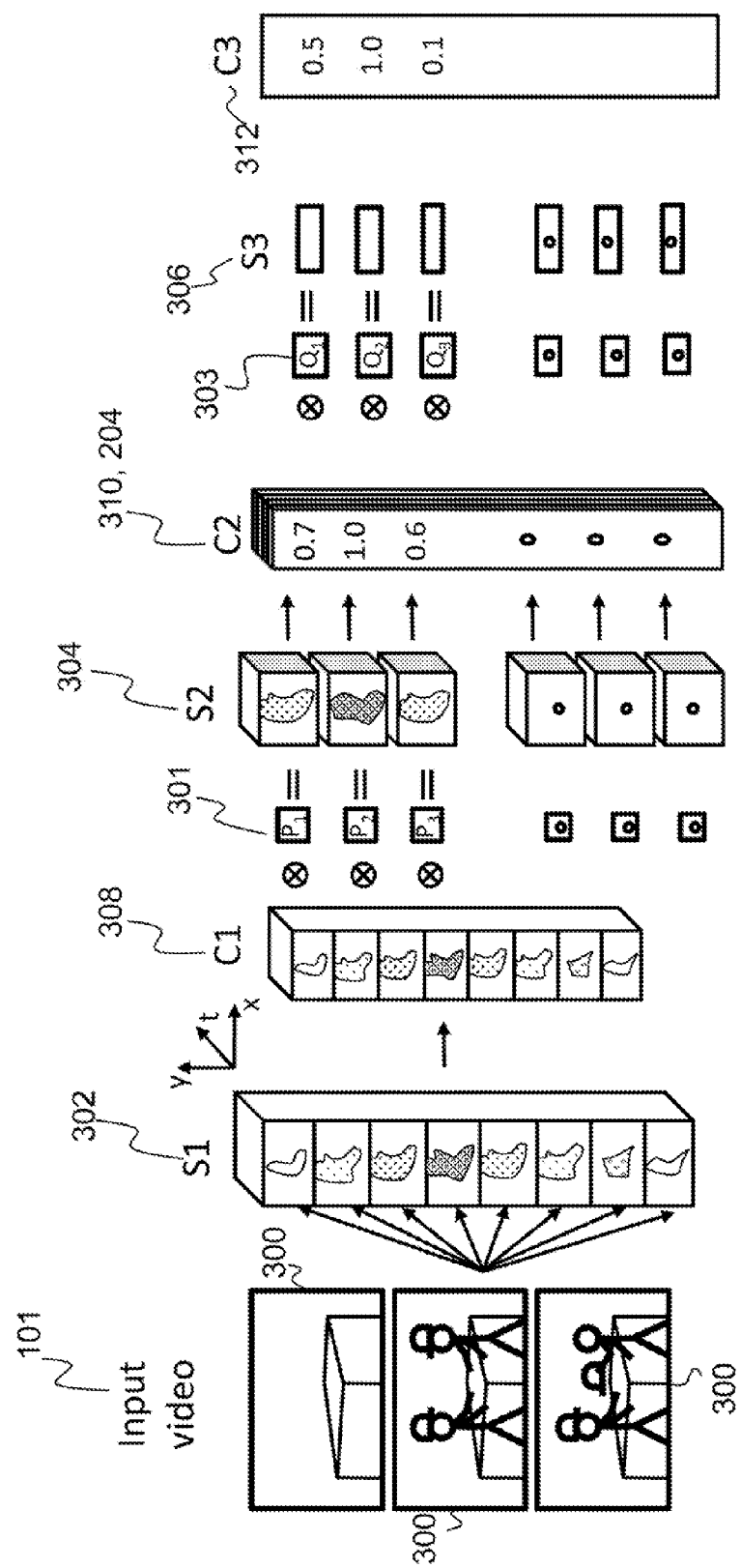
FIG. 3 illustrates a spatio-temporal representation of video flow according to the present invention.

In the present invention, an event is defined as something that happens at a given place and duration in time. An atomic event is one from which complex events are composed. FIG. 3 illustrates the basic processes comprising the hierarchical feedforward architecture used to represent atomic events (see Literature Reference No. 29). S and C stand for layers of simple (S) and complex (C) cells of the mammalian visual pathway, which are emulated using filtering and max operations, giving rise to information selectivity and invariance properties required in visual event representation. The C1 and C2 layer filters represent spatial and spatio-temporal features, respectively. The latter are microactions 204. S3 is a vector time-series, and C3 is a time-invariant microaction activation pattern used to represent atomic events.

Each image 300 (frame) of an input video 102 is sequentially filtered and max-pooled by S- and C-units, corresponding to the simple and complex cells of the V1, V2 areas of the visual cortex. The S units build up selectivity for increasingly complex patterns (e.g. edges to arms to moving arms), and C units bring about position-, scale- and time-invariant properties. Each S layer represents filtering of images from the layer before. S1 302 is obtained by filtering each image 300 in the image sequence by a bank of Gabor wavelets. S2 304 is obtained by filtering each output from C1 308 by a bank of C1-filters 301 represented by the variables $P_1$, $P_2$, $P_3$, and so on. Likewise, S3 306 is obtained by filtering C2 310 with a bank of C2-filters 303 represented by variables $Q_1$, $Q_2$, $Q_3$, and so on. The C1 filters 301 operate only individual images, while the C2-filters 303 operate across several images in time. C1 308, C2 310, and C3 312 responses are obtained by a max-pooling operation, which refers to taking the maximum over a set of pixels. This set or "receptive field" increases in size; C1 computes the max over a neighborhood of pixels, C2 computes the max over the entire image, and finally C3 computes the max over the entire image sequence.

The filters used by each of the three S layers (S1 302, S2 304, and S3 306) represent a dictionary of Gabor wavelet-like features (not shown), which gives rise to local spatio-temporal patterns (i.e., C1 308 filters), resulting in microactions 204 (i.e., C2 310 filters). Each element of the max-pooled C-layer output represents the maximum activation level (i.e., filter response) of these patterns in video but over a neighborhood of pixels (C1 308), of the image (C2 310), and of a duration in time (C3 312). The final C3 312 feature consists of microaction activation patterns that serve as the scale-, position- and time-invariant representation of the visual event.

In the basic model, the C3 312 features represent each video clip for a support-vector-machine classifier to determine the event class. The results were state-of-the-art with 92% average correct classification rate for 9 event classes with a chance rate of 11% (see Literature Reference Nos. 29, 61). A recently published mathematical theory of the feedforward architecture, known as the Neural Response, implied that prototype comparisons (filtering) in C-space are equivalent to comparisons in the projected (dimensionally reduced) space. In other words, any S-unit may operate on the dimensionally reduced space with no loss of representation performance. With dimensionality reduction in place of sampling to learn the C1 308 and C2 310 filters as in the basic model, it is expected that the same accuracy for many more atomic-event classes will be maintained. Compositions of these atomic-events will account for remaining visual events. The approach of the present invention uses reduction methods like Laplacian Eigenmaps (see Literature Reference No. 5) and Deep Belief Networks (see Literature Reference No. 24) to not only reduce the number of filters required, but also account for more samples in the reduced set of filters, which unlike sampling may miss pertinent samples. Furthermore, the use of these reduction methods preserves the model's capability to learn the C1 308 and C2 310 filters from a continuous stream of unlabeled videos. The classifier that operates on the C3 312 features, however, is learned in a supervised manner.

The new representation is universal in that the representations need only be learned from a few event videos to effectively represent all event videos. As evidence of this claim, the feedforward architecture for object recognition (S1-C1-S2-C2 layers only) was shown to perform as well for object-specific filters (i.e., filters learned from only the images of the target object) as for non-object-specific filters (i.e., filters learnt from all object images) (see Literature Reference No. 60). This conclusion should be true for the additional S3-C3 layers and the spatio-temporal representation for video in the present invention, implying that the event representation learned using videos of events occurring in one environment will suffice to represent atomic visual events in an operational environment. Finally, a video attention model is used to suppress irrelevant information due to clutter. Analogous to spatial attention in feedforward models for object recognition (see Literature Reference Nos. 12, 27), each salient region of a video frame will be joined if pixels are connected over time. Then, this spatio-temporal mask will be used by the feedforward architecture to modulate activations outside the volume of interest.

(2.3) Spatio-Temporal Action Concepts: A Concept Hierarchy of Actions

The domain of visual events is vast with multiple interactions between large numbers of objects and many possible manifestations for each of the events. Describing each class of events by an independent model, as is often done in the current literature (see Literature Reference No. 40, 72), makes the problem intractable, especially when trying to learn a large collection of useful events. As children develop, they learn and link action concepts over time by viewing many actions and grouping them to develop mental models for prediction. Over time, these concepts are automatically reused, added, adjusted, and refined as more events are encountered. Moreover, these extensible concepts allow generalization and induction from sparse data. It is this cognitive ability that is mimicked in the system described herein. Having this capability enables the system to automatically, in an unsupervised manner, cluster actions to learn classes of events, learn the temporal and causal relationship between events, add and refine events, and predict the result of a sequence of similar, but not exact, events.

The relevant steps in the present system that first builds a concept hierarchy will be described in detail below. The system is aimed at modeling human concept learning. Humans easily recognize the several possible manifestations of an event, for example, "run", "jog", and "walk" are instances of a "person moving." There is evidence that when learning new words, children first classify unlabelled objects into non-overlapping clusters before they reason about them (see Literature Reference Nos. 45, 59). Analogously, the present invention first learns the similarity between actions by organizing them into a hierarchy before it learns to reason with them. In order to build the hierarchy, training videos are initially broken up so that they are weakly labeled and contain a homogenous single action, referred to as an atomic event. These are actions where the microactions from the previous section correspond to a single event (i.e. a walk, run, jog, sprint, give, take, put down).

Each training video is sent though a saliency/attention module that extracts regions it deems are attention-worthy. The attended regions are then represented by single vectors (e.g., the C3 vector from the previous section) that output a time and space invariant vector. These atomic event vectors are the input variables to the form and structure discovery algorithm, which organizes all atomic actions it knows so far in the best form (e.g., clusters, grid, hierarchy, tree) and structure (e.g., connectivity) that it has determined via Bayesian inference. At first, only clusters form, but these clusters are soon converted into a richer form, such as a hierarchy supporting relationships between clusters. A hierarchy is a type of form where the nodes represent C3 clusters. Under the hierarchy, all instances of "run" will be clustered under the same sub-branch. A new branch is created if the algorithm, through the process of new data accumulation and inference, decides that "sprint" is different from "run." Thus, this approach will handle dynamic branching as a natural consequence of building the structure.

An illustration of the building of an action-concept hierarchy is shown in FIG. 4A. The structure is generated using a graph grammar whose basic operation involves replacing a parent node with two (or more) child nodes and specification of how to connect the children to each other and to the neighbors of the parent node. As a non-limiting example, the action-concept hierarchy depicted in FIG. 4A was built from data that captured the similarity between actions. The attention model module (FIG. 2, 200) of the present invention learns the action-concept hierarchy in an unsupervised manner using a compact graph grammar. Each node in the hierarchy is a cluster 400 of microactions (e.g., give, pass, throw).

Inference is used to score the relationship between entities in the hierarchy by P(Structure, Form|Data) α P(Data|Structure)P(Structure|Form)P(Form). P represents α conditional probability function, where | denotes "given". The symbol α denotes "proportional to". Here, "Form" refers to how concepts can be organized (e.g., in a tree, ring, list, etc.), "Structure" refers to the relationship between nodes in the form (i.e., a relationship between two nodes indicates whether or not they are linked and the direction of causality if they are linked), and "Data" refers to input that gets grouped into nodes. Since it is biased towards a hierarchical interpretation, P(Form) will contain the bias. P(Structure|Form) biases the structure and keeps the number of nodes small. The remaining term P(Data|Structure) is used to account for how well the chosen structure models the data. The covariance of the distribution describing the node encourages nearby nodes to be similar, thus promoting a smooth transition in features of nearby atomic events. For each branch representing a cluster such as "run", all the instances are used to create a Hidden Markov Model (HMM) (depicted as element 126 in FIG. 1) to represent the dynamics for that action. This is helpful for segmenting training and test videos in addition to forming the dynamic nodes for Partially Dynamic Bayesian Networks (PDBN), as will be described in detail below.

For those actions that involve objects, an intelligent form of clustering known an Infinite Relational Model (IRM) (see Literature Reference No. 30) can be used to further improve the hierarchy. IRM is an unsupervised, non-parametric Bayesian model that is capable of discovering clusters that indicate systems of related concepts. The benefit of using IRM is that it can cluster data based not just on similarity in feature space, but also with the relation to the objects the actions are involved in. The object information and the relationship between objects are obtained using current state-of-the-art visual object recognition algorithms (see Literature Reference Nos. 14, 26, 60).

The previous step described above provides self-organized clusters in the form of a hierarchy 401, as shown in FIG. 4A. In the next step, a framework, which encapsulates the temporal and causal relationships between clusters in the hierarchy 401, is constructed so that information from all input videos can be consolidated into a compact knowledge network. A unique aspect about this framework is its ability to self-organize and refine itself in an unsupervised manner as more data is encountered. This type of model enables the extraction of the semantic meaning of actions from all videos and consolidates the effect of a class of actions. For instance, the "person moving" class describes "run", "walk", "sprint", and "jog". The model used in the present invention takes on the form of a hierarchical Partially Dynamic Bayesian network (PDBN). A PDBN is a network consisting of static objects (or intent) and dynamic nodes, where actions are described by HMMs learned for each cluster (see Literature Reference No. 68) and whose structure is adjusted as the hierarchy 401 evolves with Bayesian inference.

An example of such a model with both causal and temporal links is shown in FIG. 4B, which depicts a PDBN 403 built from data that captures the temporal and causal relations between event-concepts and static variables (e.g., objects). The PDBN 403 shown represents static nodes 402 (i.e., objects and later intent) and dynamic nodes 404 (i.e., actions). Each dynamic node 404 in the network represents a cluster 400 in the hierarchy 401 of FIG. 4A. Composite actions are represented by transitions (arrows 406) in the hierarchical PDBN 403 in temporal domain. Causal links 408 can also represented here (e.g., having object-in hand causes a put-down).

In order to learn this network, learning methods that use structured priors (see Literature Reference No. 44) are used to compute the transition probabilities between the clusters (hereinafter referred to as "nodes") in the model. Structure learning assumes that the model is learning both connectivity between the nodes and the weights. In the model of the present invention, however, the focus is on transferring knowledge from the concept hierarchy into the network in the form of structured priors so that transition probabilities are not just learned for a particular expression of an action, but also for the whole class to which the action belongs. This allows the model to infer that a person who walked and put down something is a similar event (at a coarser scale) to a person who ran and put down something, for example. If the consequences of the latter event are known from previous experience, then it will now be allowed to be translated to the walk event because walk is similar to run. This allows the model to make inductive inferences from sparse data and can support envisionment by providing hypotheses for consideration. The model assumes that variables are a function of the classes they are members of, and edge connectivity is determined by an inference algorithm that uses Markov Chain Monte Carlo (MCMC) sampling to infer the causal relationship between the classes.

(2.4) Mental Imagery Processes: Envisionment and Knowledge Discovery

Recognition and reasoning are addressed by a combination of graphical models and symbolic reasoning. Graphical models handle uncertainty well, but do not facilitate detailed scene content or spatio-temporal analysis. Consequently, the system described herein uses schemas, which are hierarchical representations containing various data types (see Literature Reference No. 69). The system further utilizes spatio-temporal generalizations of State, Operator and Result (Soar) Spatial/Visual System (SVS) (see Literature Reference No. 66). Soar is a symbolic cognitive architecture that presents a view of what cognition is and an implementation of that view through a computer programming architecture for artificial intelligence (AI). SVS provides functional solutions to theoretical topics such as visual inspection, mental imagery, and storing and retrieving spatial memories. The state-of-the-art Soar was also chosen because of its ability to support rapid deduction despite large datasets (see Literature Reference No. 36) and interface with visual modules (see Literature Reference No. 76). In the present approach, visual inspection and mental imagery processes arise through "explaining away", "predicate extraction", and "predicate projection", which will be explained in detail below.

Graphical models represent actions with nodes and causation with edges. Belief propagation interpolates and predicts actions while handling missing or imprecise location or timing information (see Literature Reference No. 77). Deductions from scene content or spatio-temporal inspection "explain away" or bias action recognition by rescaling posterior or state probabilities (see Literature Reference No. 32).

Symbolic representations use "predicate extraction" or visual inspection to quantize visual details into schemas. Matching visual input with scene graph sequences bind actors and objects to roles in scripts, as depicted in FIG. 5A. This allows the recognition of complex interactions; interpolation and prediction across long time horizons; imagination of occluded objects; and even the ability to uncover actor intent (see Literature Reference No. 69). Spatio-temporal reasoning guides scene interpretation using physical constraints (e.g., If X is slippery, X may be dropped) and will be augmented with non-visual information (e.g., rain makes X slippery) (see Literature Reference No. 66).

Visual imagery of symbolic representations occurs through "predicate projection," which renders actions and objects. Symbolic representations are also easily transcribed (see Literature Reference No. 62). This supports introspective analysis and reporting. Visualization occurs through direct de-referencing of "perceptual pointers" for on-line input or top-down "hallucinations" through graphical nodes for off-line imagination (see Literature Reference Nos. 24, 25). FIGS. 5A and 5B illustrate schema binding and its envisionment with transcription, respectively. Schemas bind actors (e.g., Bob 500 and Alice 502) and objects (e.g., hats 504) to atomic actions (e.g., "exchange" 506) to, among other things, model complex interactions. In FIG. 5A, S refers to subject, DO refers to direct object, and IO denotes indirect object. As depicted in FIG. 5B, the envisionment transcription shows Alice 502 and Bob 500 exchanging hats 504. Scene content and spatio-temporal reasoning is used to rapidly prune hypothesis trees (FIG. 1, 122) within graphical models. In this case, "drop" 508 is also highly probable because of the use of non-visual information about weather (i.e., rain creates slippery objects).

The present invention extends the Soar+SVS framework to handle spatio-temporal information by generalizing the mental imagery processes described above. By refining uncertainty within graphical models by top-down pruning of hypotheses through scene content and spatio-temporal reasoning, a 20% improvement in accuracy of envisioned scenario is expected. Similar interfaces have shown a 10 to 25% accuracy improvement in vehicle track longevity (see Literature Reference No. 76).

Grounding, or the mutual reinforcement of visual and symbolic representations, uses automated form learning (see Literature Reference No. 70) and schema binding (see Literature Reference Nos. 6, 72), as described below. Respective representations are also refined for computational reasons through relevance reasoning (see Literature Reference No. 41) and "chunking" in each module. Non-visual information from symbolic reasoning can be embedded in graphical models by inserting a conditioning node. For example, in the graphical model depicted in FIG. 5A, weather information may bias "hold" 510 to "drop" 508. The topology of such nodes can be determined with automated form learning (see Literature Reference No. 70). Conversely, visual information can embellish schemas. For example, perhaps 60% of "exchange" actions involve hats. Since schemas are polymorphic and extensible, this information can be embedded (see Literature Reference Nos. 6, 69). Richer models in both domains provide more concrete visualizations and more efficient recognition. Geometric reasoning with visual information in one domain, for example, is 1.7 times faster than purely symbolic reasoning (see Literature Reference No. 38). Similar improvements are provided by the present invention when extending SVS to the spatio-temporal domain.

To refine model representations, relevancy reasoning (depicted as element 238 in FIG. 2) (see Literature Reference No. 41) and "chunking" is applied for visual and symbolic modules, respectively. Relevancy reasoning techniques merge nodes depending on statistical properties. In addition to speeding hypothesis convergence, relevancy reasoning techniques also simplify further model parameter and form learning. Symbolic abstraction can "chunk" representations and associated operators, with similar functional benefits to relevancy reasoning.

Lastly, use counts and storage size information can be used to prune infrequently used or over specified models in either representation. Off-line inspection of graphical models has been shown to speed computation by 95% to 25% compared to un-optimized and partially optimized models, respectively (see Literature Reference No. 41); for symbolic reasoning, the trend is similar: 88% and 33%. By pruning models, a significant improvement in computational time is provided by the present system.

(2.5) System Integration

The present invention also comprises a video processing subsystem architecture for the taskable smart camera system that will enable implementation and deployment of visual intelligence software, will meet the size, weight, and power constraints of the typical man-portable unmanned ground vehicle (UGV), is portable to a wide range of execution environments (i.e., hardware+operating system), and can also be scaled up or down for deployment to a wide range of operational platforms.

The high-level systems integration concept of the present invention allows known and candidate visual intelligence approaches to be integrated with known camera subsystems, while remaining within size, weight, and power (SWaP) constraints appropriate for small, militarily-relevant UGVs. The high space and time complexity of the algorithms and the desire for a small SWaP envelope are the primary system design drivers. In the present invention, the focus is on maximizing the diversity, extensibility, and power efficiency of the embedded computational resources to achieve flexibility in mapping components of the visual intelligence algorithms to the most appropriate and efficient hardware.

Figure 6:
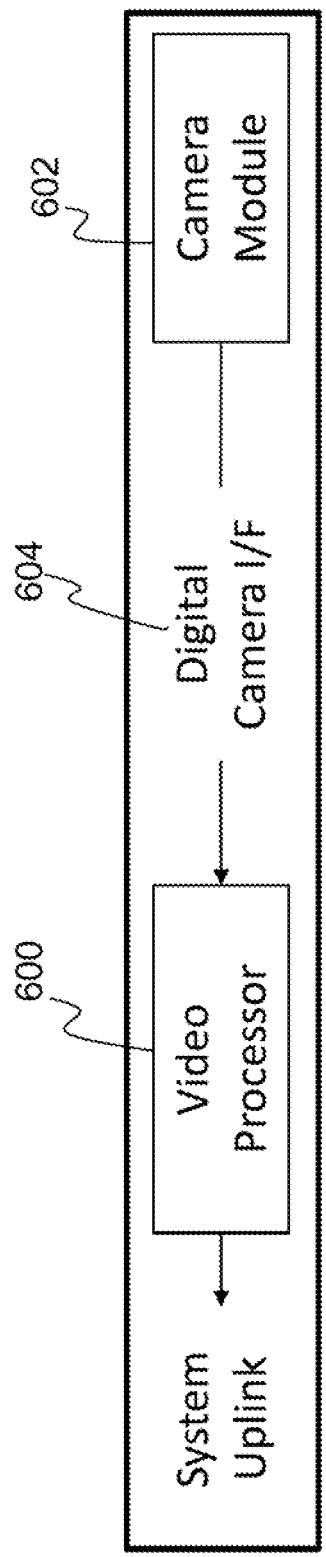
FIG. 6 is a diagram of a smart camera subsystem according to the present invention.

Presented herein is a non-limiting example of an architecture showing the approach used to integrate the visual intelligence algorithms of this invention. The flexibility of the approach begins with the configuration of the camera and the video signal processing. A two-module approach, with a separate video processor module 600 and camera module 602 is illustrated in FIG. 6. There are two versions of the camera module 602 with a common interface to the video processor module 604: one that contains a video analog-to-digital converter (ADC) and interfaces electronics, and one that contains a color digital camera. The ADC camera module allows for interfacing the smart camera to known, existing camera systems. The camera module 602 allows installation of the smart camera onto a vehicle (e.g., UGV) that does not currently carry a camera, or carries a camera with insufficient video characteristics. Separating the camera module 602 from the video processor module 600 allows for a more robust design of the core processing capability, yet allows for flexibility on various size and types of vehicles. In other words, by separating the camera module 602 from the video processor module 600, the smart camera subsystem can be used as a stand-alone system or with existing UGV video.

Figure 7:
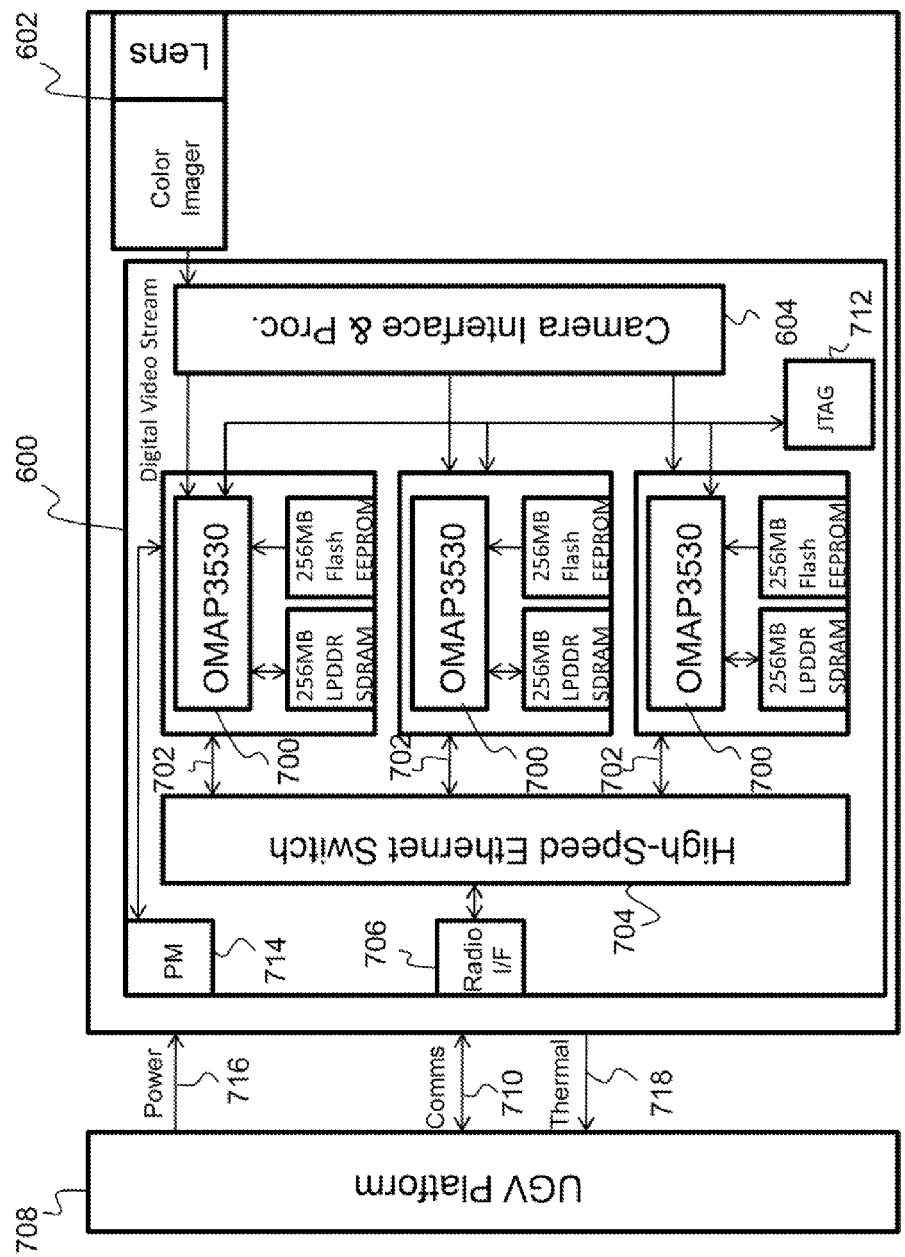
FIG. 7 illustrates a video processor subsystem architecture according to the present invention.

FIG. 7 diagrams a video processor subsystem architecture which provides high performance density (ops/W) and memory bandwidth in a lightweight, low-power package. As a non-limiting example, the digital camera module 602 uses a camera from the Bobcat® series made by Imperx Incorporated located at 6421 Congress Avenue, Boca Raton, Fla. 33487. The Bobcat series are programmable high-quality low-noise interline-transfer Bayer pattern color CCD-based cameras with power over Camera Link uncompressed video interface and performance ranging from 640×480×8 bit @260 frames per second (fps), to 16 megapixels (Mpix) 14-bit @4 Hertz (Hz), with 60 decibel (dB) signal to noise ratio. The Bobcat has an internal field-programmable gate array (FPGA) based processing engine, providing a myriad of functionality such as dynamic transfer function correction, multiple areas of interest, automatic gain and iris control with programmable region of significance, programmable resolution, and microsecond exposure control.

The video processor module 600 combines a camera interface and video pre-processor 604, that conditions and partitions the input video from the color imager into digital video streams, with a cluster of microprocessors 700 (e.g., Texas Instruments (TI) Open Multimedia Application Processor (OMAP) microprocessors made by TI located at 12500 TI Boulevard, Dallas, Tex. 75243). Each microprocessor 700 is connected to Flash Electrically Erasable Programmable Read-Only Memory (EEPROM) for operating system, program, and constant storage, and to SDRAM for runtime program and data storage. OMAP processors enable the current generation of multimedia-capable cell phones, and provide very high performance per Watt. The current design is based on the OMAP3530, but the design approach is applicable to any of the emerging heterogeneous multi-core microprocessors 700, such as the OMAP4x, that integrate central processing unit (CPU), a digital signal processor (DSP), and a graphics processing unit (GPU) in a single low-power package.

Each OMAP3530 provides a 600 megahertz (MHz) ARM Cortex-A8 RISC CPU core with the ARM NEON single-instruction multiple-data (SIMD) floating-point coprocessor; an Image, Video, Audio Accelerator (IVA2) subsystem that includes a TI TMS320C64x+ Very Long Instruction Word (VLIW) DSP core plus additional video hardware accelerators; and the Imagination Technologies PowerVR SGX530 graphics accelerator core. Communication between processors can be supported by standard Ethernet channels 702 and switched via a network switch 704 on the board. A radio interface 706 provides two-way communications to the UGV Platform 708 through the Comms 710 link. A Joint Test Action Group (JTAG 712) interface is provided to support hardware test and software debug. A Power Management (PM 714) module manages the voltage levels and clock enables for the microprocessors 700, to keep power consumption at a minimum. Electrical power 716 flows into the video processor module 600, and heat (thermal 718) from power dissipation flows to the supporting hardware environment provided by the UGV Platform 708. This design approach allows visual intelligence software to be executed on the Cortex CPUs with a minimum of porting effort. Optionally, additional performance can be gained by using target-specific libraries (which make use of the other functional units in the OMAP).

A preliminary identification of typical computational primitives in the key visual intelligence system algorithms was done to determine the best hardware mapping, which simultaneously profiled similar algorithms to find computational bottlenecks. Analysis suggests that key computational bottlenecks in the invention are its representational algorithms and the multiple center-surround type convolutions that must be performed on each video frame. These algorithms have one or more stages in which an image is filtered using different kernels (i.e., orientation, motion-specific filters) at multiple scales to extract relevant features. For example, the CBCL algorithm (see Literature Reference No. 60) has two filtering stages: S1 and S2. To generate an output for stage S1, there are 64 filters (4 orientations at 16 scales). To generate the S2 result, there are 1000 filters computed at 8 scales. Multiple nested convolutions such as these can easily saturate processing resources, including storage and memory. This type of analysis suggests that the CBCL algorithm could be partitioned between the pre-processing FPGA and the GPUs in the OMAP chips.

Figure 8:
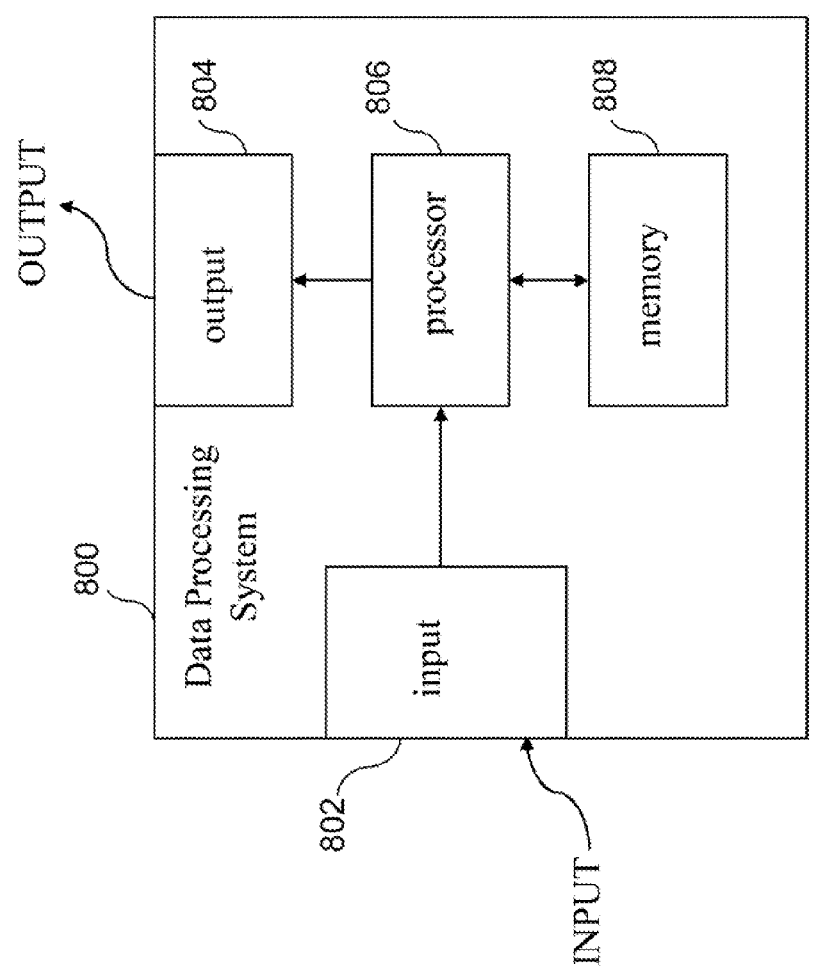
FIG. 8 is an illustration of a data processing system according to the present invention.

FIG. 8 illustrates a block diagram depicting components of a data processing system 800 (e.g., computer) incorporating the operations of the method described above and throughout the specification. The method utilizes a data processing system 800 for storing computer executable instructions (or instruction means) for causing a processor to carry out the operations of the above described method. The data processing system 800 comprises an input 802 for receiving information from a user. Information received may include input from devices such as cameras, scanners, keypads, keyboards, microphone, other peripherals such as storage devices, other programs, etc. The input 802 may include multiple "ports." An output 804 is connected with a processor 806 (or processors) for providing information for transmission to other data processing systems, to storage devices, to display devices such as monitors, to generating information necessary for delivery, and to other mechanisms for presentation in user-usable forms. The input 802 and the output 804 are both coupled with the processor 806, which may be a general-purpose computer processor or a specialized processor designed specifically for use with the present invention. The processor 806 is coupled with a memory 808 to permit storage of data and software to be manipulated by commands to the processor 806. The memory 808 includes instructions such that when the instructions are executed, the processor 808 (or processors) performs operations described above and throughout the specification.

An illustrative diagram of a computer program product embodying the present invention is depicted in FIG. 9. As a non-limiting example, the computer program product is depicted as either a floppy disk 900 or an optical disk 902. However, as mentioned previously, the computer program product generally represents computer readable code (i.e., instruction means or instructions) stored on any compatible non-transitory computer readable medium.

What is claimed is:

1. A system for embedding visual intelligence, the system comprising:
   one or more processors and a memory having instructions such that when the instructions are executed, the one or more processors perform operations of:
   receiving an input video comprising input video pixels representing at least one action and at least one object having a location;
   processing at least one input query to elicit information regarding the input video;
   generating microactions from the input video using a set of motion sensitive filters derived from a series of filtering and max operations in repeating layers;
   learning of a relationship between the input video pixels and the microactions in both unsupervised and supervised manners;
   learning, from the microactions, at least one concept, comprising spatio-temporal patterns, and a set of causal relationships between the spatio-temporal patterns in an automatic, unsupervised manner using form and structure learning techniques;
   learning to acquire new knowledge from the spatio-temporal patterns using mental imagery models in an unsupervised manner;
   and
   presenting a visual output to a user based on the learned set of spatio-temporal patterns and the new knowledge to aid the user in visually comprehending the at least one action in the input video.

2. The system for embedding visual intelligence as set forth in claim 1, wherein the visual output is at least one of a video and a textual description.

3. The system for embedding visual intelligence as set forth in claim 2, further comprising:
   a spatio-temporal representations module for capturing event-invariant information in the input video using a series of filtering and max operations in repeating layers;
   an attention model module for generating video masks to focus attention of the spatio-temporal representations module to specific areas of the input video in order to generate the microactions; and
   a concept learning module for stringing together the microactions to compose full actions and learning of a set of relationships between the spatio-temporal patterns through form and structure learning.

4. The system for embedding visual intelligence as set forth in claim 3, further comprising:
   a visual object recognition module for determining the location of the at least one object in the input video; and
   a hypothesis module for generating at least one hypothesis of the at least one action based on known concepts and the at least one object in the input video.

5. The system for embedding visual intelligence as set forth in claim 4, further comprising:
   a visual inspection module for comparing the at least one hypothesis with the input video;
   a validation module for validating the at least one hypothesis using feedback from the visual inspection module; and an envisionment module for generating envisioned imagery of the at least one hypothesis to reason and gain new knowledge.

6. The system for embedding visual intelligence as set forth in claim 5, further comprising:
   a knowledgebase module for storing domain knowledge, the set of relationships between the spatio-temporal patterns from the concept learning module, and knowledge generated from reasoning on the envisioned imagery;
   a dialog processing module for parsing at least one input text query; and
   a symbolic reasoning module for locating answers to the at least one input text query in the knowledgebase module and outputting a textual description of the at least one input text query.

7. The system for embedding visual intelligence as set forth in claim 6, wherein the set of relationships between the spatio-temporal patterns comprises a plurality of nodes, where each node represents a cluster of microactions.

8. A computer-implemented method for embedding visual intelligence, comprising acts of:
   receiving an input video comprising input video pixels representing at least one action and at least one object having a location;
   processing at least one input query to elicit information regarding the input video;
   generating microactions from the input video using a set of motion sensitive filters derived from a series of filtering and max operations in repeating layers;
   learning of a relationship between the input video pixels and the microactions in both unsupervised and supervised manners;
   learning, from the microactions, at least one concept, comprising spatio-temporal patterns, and a set of causal relationships between the spatio-temporal patterns in an automatic, unsupervised manner using form and structure learning techniques;
   learning to acquire new knowledge from the spatio-temporal patterns using mental imagery models in an unsupervised manner;
   and
   presenting a visual output to a user based on the learned set of spatio-temporal patterns and the new knowledge to aid the user in visually comprehending the at least one action in the input video.

9. The method for embedding visual intelligence as set forth in claim 8, wherein the visual output is at least one of a video and a textual description.

10. The method for embedding visual intelligence as set forth in claim 9, further comprising acts of:
    a spatio-temporal representations module for capturing event-invariant information in the input video using a series of filtering and max operations in repeating layers;
    an attention model module for generating video masks to focus attention of the spatio-temporal representations module to specific areas of the input video in order to generate the microactions; and
    a concept learning module for stringing together the microactions to compose full actions and learning of a set of relationships between the spatio-temporal patterns through form and structure learning.

11. The method for embedding visual intelligence as set forth in claim 10, further comprising acts of:
    determining the location of the at least one object in the input video within a visual object recognition module; and generating at least one hypothesis of the at least one action based on known concepts and the at least one object in the input video within a hypothesis module.

12. The method for embedding visual intelligence as set forth in claim 11, further comprising acts of:
    comparing the at least one hypothesis with the input video within a visual inspection module;
    validating the at least one hypothesis using feedback from the visual inspection module within a validation module; and
    generating envisioned imagery of the at least one hypothesis to reason and gain new knowledge within an envisionment module.

13. The method for embedding visual intelligence as set forth in claim 12, further comprising acts of:
    a knowledgebase module for storing domain knowledge, the set of relationships between the spatio-temporal patterns from the concept learning module, and knowledge generated from reasoning on the envisioned imagery;
    a dialog processing module for parsing at least one input text query; and
    a symbolic reasoning module for locating answers to the at least one input text query in the knowledgebase module and outputting a textual description of the at least one input text query.

14. The method for embedding visual intelligence as set forth in claim 13, wherein the set of relationships between the spatio-temporal patterns comprises a plurality of nodes, where each node represents a cluster of microactions.

15. A computer program product for embedding visual intelligence, the computer program product comprising: computer-readable instruction means stored on a non-transitory computer-readable medium that are executable by a computer having a processor for causing the processor to perform operations of:
    receiving an input video comprising input video pixels representing at least one action and at least one object having a location;
    processing at least one input query to elicit information regarding the input video;
    generating microactions from the input video using a set of motion sensitive filters derived from a series of filtering and max operations in repeating layers;
    learning of a relationship between the input video pixels and the microactions in both unsupervised and supervised manners;
    learning, from the microactions, at least one concept, comprising spatio-temporal patterns, and a set of causal relationships between the spatio-temporal action patterns in an automatic, unsupervised manner using form and structure learning techniques;
    learning to acquire new knowledge from the spatio-temporal patterns using mental imagery models in an unsupervised manner;
    and
    presenting a visual output to a user based on the learned set of spatio-temporal patterns and the new knowledge to aid the user in visually comprehending the at least one action in the input video.

16. The computer program product for embedding visual intelligence as set forth in claim 15, wherein the visual output is at least one of a video and a textual description.

17. The computer program product for embedding visual intelligence as set forth in claim 16, further comprising instruction means for causing the processor to perform operations of:

a spatio-temporal representations module for capturing event-invariant information in the input video using a series of filtering and max operations in repeating layers;

an attention model module for generating video masks to focus attention of the spatio-temporal representations module to specific areas of the input video in order to generate the microactions; and a concept learning module for stringing together the microactions to compose full actions and learning of a set of relationships between the spatio-temporal patterns through form and structure learning.

18. The computer program product for embedding visual intelligence as set forth in claim 17, further comprising instruction means for causing the processor to perform operations of:

determining the location of the at least one object in the input video within a visual object recognition module; and generating at least one hypothesis of the at least one action based on known concepts and the at least one object in the input video within a hypothesis module.

19. The computer program product for embedding visual intelligence as set forth in claim 18, further comprising instruction means for causing the processor to perform operations of:

comparing the at least one hypothesis with the input video within a visual inspection module;

validating the at least one hypothesis using feedback from the visual inspection module within a validation module; and generating envisioned imagery of the at least one hypothesis to reason and gain new knowledge within an envisionment module.

20. The computer program product for embedding visual intelligence as set forth in claim 19, further comprising instruction means for causing the processor to perform operations of:

a knowledgebase module for storing domain knowledge, the set of relationships between the spatio-temporal patterns from the concept learning module, and knowledge generated from reasoning on the envisioned imagery;

a dialog processing module for parsing at least one input text query; and a symbolic reasoning module for locating answers to the at least one input text query in the knowledgebase module and outputting a textual description of the at least one input text query.

21. The computer program product for embedding visual intelligence as set forth in claim 20, wherein the set of relationships between the spatio-temporal patterns comprises a plurality of nodes, where each node represents a cluster of microactions.

22. A video processing subsystem for a taskable smart camera system to be utilized with the system set forth in claim 1, comprising:

a video processor module;

a camera module separate from the video processor module; and a common interface between the video processor module and the camera module.

* * * * *